(12) United States Patent
Rinko

(10) Patent No.: US 12,438,500 B2
(45) Date of Patent: Oct. 7, 2025

(54) OPTICAL STRUCTURE FOR SOLAR APPLICATIONS AND MANUFACTURING METHOD

(71) Applicant: OY ICS INTELLIGENT CONTROL SYSTEMS LTD, Helsinki (FI)

(72) Inventor: Kari Rinko, Helsinki (FI)

(73) Assignee: OY ICS INTELLIGENT CONTROL SYSTEMS LTD, Helsinki (FI)

( * ) Notice: Subject to any disclaimer, the term of this patent is extended or adjusted under 35 U.S.C. 154(b) by 790 days.

(21) Appl. No.: 17/427,564

(22) PCT Filed: Jan. 31, 2020

(86) PCT No.: PCT/FI2020/050062
§ 371 (c)(1),
(2) Date: Jul. 30, 2021

(87) PCT Pub. No.: WO2020/157387
PCT Pub. Date: Aug. 6, 2020

(65) Prior Publication Data
US 2022/0109398 A1     Apr. 7, 2022

Related U.S. Application Data

(60) Provisional application No. 62/799,606, filed on Jan. 31, 2019.

(51) Int. Cl.
*H02S 40/22*      (2014.01)
*G02B 3/00*       (2006.01)
*G02B 3/12*       (2006.01)

(52) U.S. Cl.
CPC ............ *H02S 40/22* (2014.12); *G02B 3/0006* (2013.01); *G02B 3/12* (2013.01)

(58) Field of Classification Search
CPC .................................. H02S 40/22; G02B 3/12
See application file for complete search history.

(56) References Cited

U.S. PATENT DOCUMENTS

| 2011/0132458 A1 | 6/2011 | Wang |
| 2011/0244187 A1 | 10/2011 | Rinko |

(Continued)

FOREIGN PATENT DOCUMENTS

| CN | 102947090 A | 2/2013 |
| CN | 205790014 U | 12/2016 |

(Continued)

OTHER PUBLICATIONS

Office Action, issued in Japanese Patent Application No. 2021-544596 dated Dec. 12, 2023.

(Continued)

*Primary Examiner* — Jayne L Mershon
(74) *Attorney, Agent, or Firm* — NIXON & VANDERHYE

(57) ABSTRACT

An thin and flat reflector solution is provided including an entirely flat, planar base element; and an at least one flat, planar carrier element provided with cavities arranged into an at least one pattern, wherein the carrier element(s) and optionally the base element are substantially optically transparent, wherein the at least one carrier element is laminated together with a base element such, that an at least one embedded, optically functional cavity pattern is established at an interface between the elements, and wherein the optical structure is rendered optically functional by adjusting cavity profiles within each the embedded pat-tern and/or within each the carrier element, wherein an optical function is selected from light reflection, light refraction and light redirection.

23 Claims, 28 Drawing Sheets

(56) References Cited

U.S. PATENT DOCUMENTS

| | | | |
|---|---|---|---|
| 2011/0296726 A1 | 12/2011 | Rinko | |
| 2012/0018758 A1* | 1/2012 | Matioli | H01S 5/1017 |
| | | | 257/E31.127 |
| 2017/0170352 A1* | 6/2017 | Vasylyev | G02B 5/0294 |
| 2017/0263796 A1 | 9/2017 | Jahelka | |
| 2018/0292066 A1* | 10/2018 | Rinko | G02B 6/42 |
| 2021/0384371 A1* | 12/2021 | Wan | H01L 31/048 |

FOREIGN PATENT DOCUMENTS

| | | |
|---|---|---|
| CN | 109148630 A | 1/2019 |
| EA | 028723 B1 | 12/2017 |
| JP | 2013524282 A | 6/2013 |
| JP | 2013524288 A | 6/2013 |
| JP | 2013243297 * | 12/2013 |
| JP | 6146627 B2 | 6/2017 |
| RU | 150125 U1 | 1/2015 |
| RU | 2573477 C2 | 1/2016 |
| TW | 201121075 A | 6/2011 |
| WO | 2018/154185 | 8/2018 |
| WO | WO20180154185 * | 8/2018 |

OTHER PUBLICATIONS

Office Action issued in Russian Patent Application No. 2021124653/28 dated Jun. 21, 2023.
Extended European Search Report issued in European Patent Application No. 20748802.4 dated Nov. 24, 2022.
Office Action issued in Indian Patent Application No. 202127038969 dated Feb. 10, 2023.
International Search Report for PCT/FI2020/050062 dated Apr. 7, 2020, 7 pages.
Written Opinion of the ISA for PCT/FI2020/050062 dated Apr. 7, 2020, 8 pages.
Search Report, issued in Chinese Patent Application No. 2020800258623 dated Jun. 26, 2024.

* cited by examiner

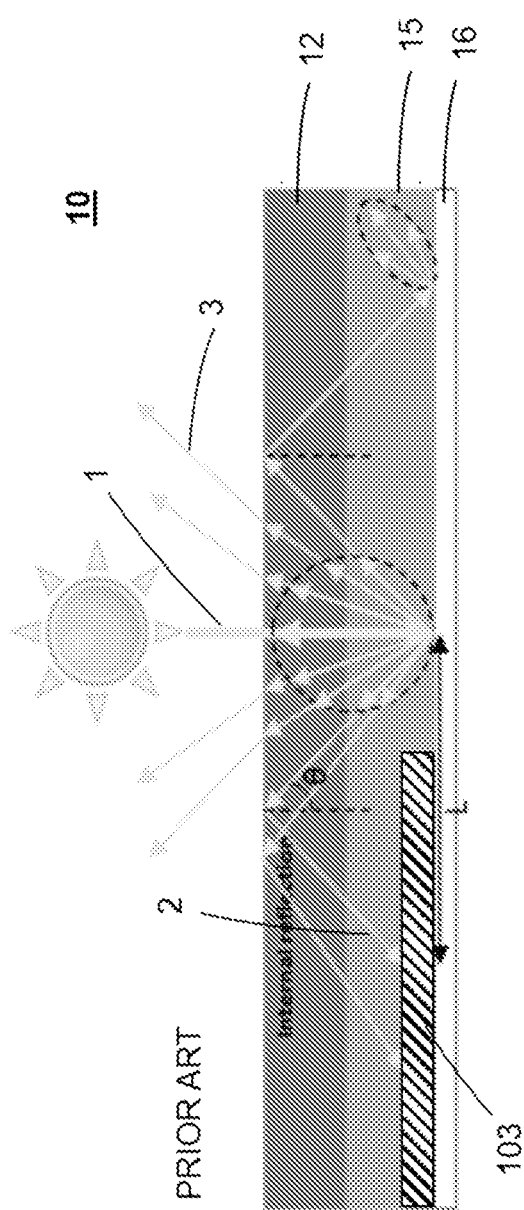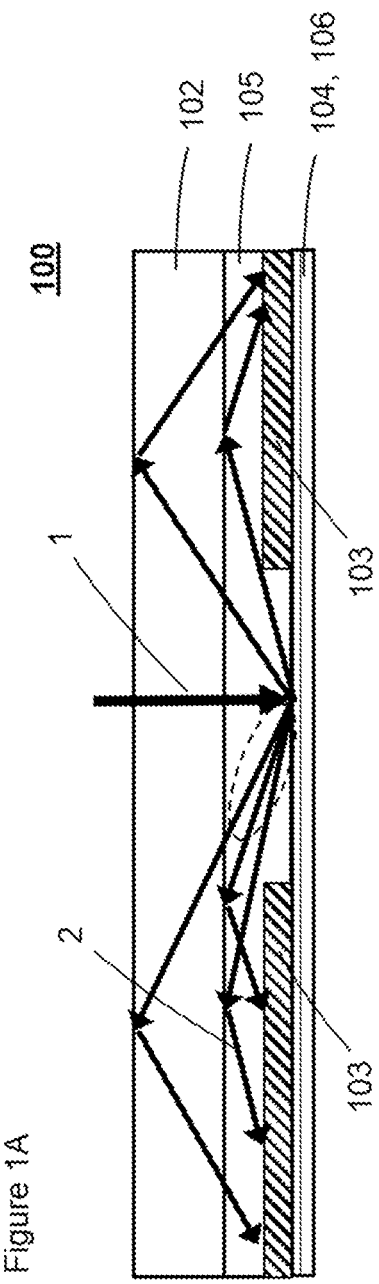

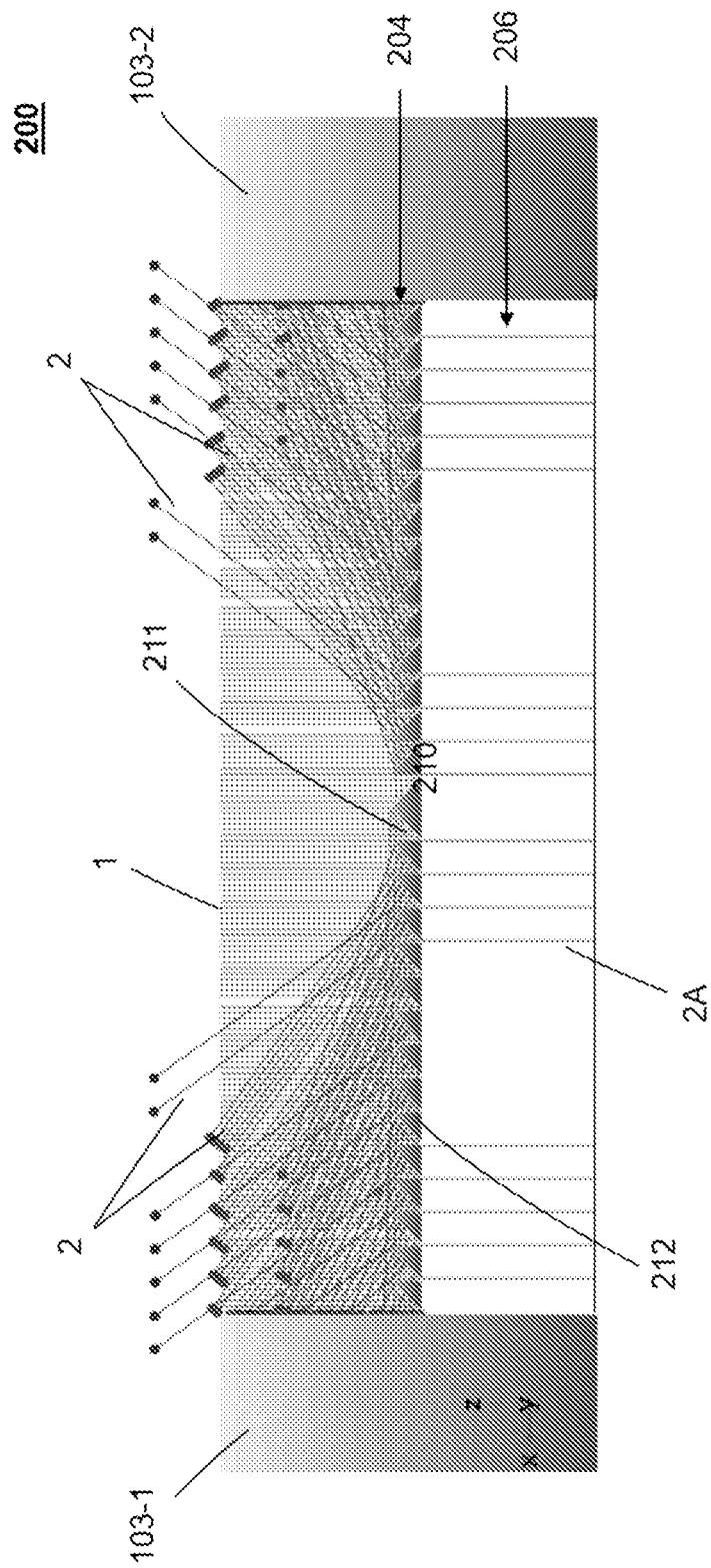

OPTICAL STRUCTURE FOR SOLAR APPLICATIONS AND MANUFACTURING METHOD

CROSS-REFERENCE TO RELATED APPLICATIONS

This application is the U.S. national phase of International Application No. PCT/FI2020/050062 filed Jan. 31, 2020 which designated the U.S. and claims priority to U.S. Provisional Application No. 62/799,606 filed Jan. 31, 2019, the entire contents of each of which are hereby incorporated by reference.

BACKGROUND OF THE INVENTION

Field of the Invention

Generally the present invention relates to optics. In particular, the present invention concerns an optical structure with improved solar radiation trapping, reflective and absorption properties.

Description of the Related Art

FIG. 1A illustrates a typical solution for a white backsheet reflector structure 10, which reflects about 44% of light incident (1) onto a solar panel (solar cells 103) out of the solar panel. Known solutions comprise a stack, wherein a photovoltaic material (PV/solar cells 103) are laminated between a backsheet 16, such as white backsheet in the present case, and a cover glass 12 with a conventional adhesive, such as ethylene-vinyl acetate (EVA) adhesive 15. Light incident 1 onto the panel arrives at the solar cell 103 directly and/or as a result of internal reflection; however, a significant amount of energy is lost due to light reflection out of the panel. Internally reflected light arriving at the PV cell 103 is indicated by reference numeral 2; whereas light reflected out of the structure 10 is indicated by reference numeral 3. From the other hand, in typical reflector structures with black backsheets (see FIG. 2) a level of light absorption in the black surface is about 95%, wherein this solar energy is lost.

Typical photovoltaic (PV) panel 1001 (FIG. 2) made of monocrystalline silicon (mono c-Si) has a passive area that surrounds PV cells 103 and covers about 5% to about 10% of the PV panel surface. In conventional solutions, this passive surface area has Lambertian reflectivity and causes energy losses due to light reflection (back the ambient) and shading, thus decreasing an amount of energy produced by the panel. FIG. 2 thus shows a number of most general reflector solutions for the solar panels 1001 and related solar panel modules 1002, with the backsheet layer 106 configured as a plate, a sheet or a film, for example, and provided in white, black- or transparent solutions. An exemplary solar panel module 1002 (on the right) that comprises a number of panels 1001 with the cells 103 may have the backsheet layer 106 with about 40% transparency.

The problem associated with light energy loss experienced by conventional back-sheet arrangements is further described below. FIG. 3A shows a backsheet module structure 10A, typically white or black, representing a state of the art. The module structure 10A comprises a backsheet layer 16 typically laminated to the bottom of the solar (PV) cells 103. Typically, heat- and pressure lamination is utilized using an optically transparent adhesive 15, such as EVA adhesive. Also other materials and white EVA can be utilized as adhesives. The module structure 10A comprises a cover layer 12, such as a glass plate. Whether the backsheet is white, it forms an isotropic reflector, which has Lambertian diffusing function. Its' reflectivity is typically between 80%-90%.

In general, more than 40% of light is reflected out of the solar panel. However, having the backsheet positioned on the bottom of the structure 10A increases light (energy) loss to more than 60%, because of internal light trapping at the bottom area. Reflectivity of the black backsheet is about 5% at its maximum, whereupon light is merely absorbed into the material without any energy gain.

SUMMARY OF THE INVENTION

An objective of the present invention is to at least alleviate each of the problems arising from the limitations and disadvantages of the related art and to provide a feasible alternative for producing various optically functional structures.

The objective is achieved by various embodiments of an optically functional layered (laminate) structure and a related method of manufacture.

The optical structure is advantageously configured as an internal reflector structure solution for solar applications.

Present invention provides for an optical structure 100, 200 with fully integrated, embedded cavity optics, such as volume optics and a flat and thin optical element, such as a reflector element, hereafter, a reflector, configured as said optical structure. The optical structure may be configured substantially optically transparent. The optical structure can be provided as a backsheet layer for a solar cell. In present disclosure, however, the reference is made to a "backsheet layer" meaning a base element layer (hereafter, 106, 206) of the optical structure. Said base element layer can be imparted with a predetermined color, such as black or white. In fact, the base layer can be imparted with any desirable color. The base layer is further laminated with an optically transparent pattern layer (a carrier element layer) to form cavity optics. The optical structure can be configured as a stripe solution having an optimal alignment with a photovoltaic surface.

In present specification, the term "optical structure" can be used interchangeably with the terms "reflector element" or "reflector structure". Furthermore, by the terms "flat" (interchangeably with "planar") we refer to entirely flat (planar) layer elements. Hence, regardless of the fact whether the laminate layer comprises a pattern or not, it is still flat and planar.

The utility of the present invention generally arises from a plurality of issues depending on embodiments. In particular, the invention provides the following advantages:

A reflector based on said optical structure can be adapted to efficiently capture solar energy (light) independent on a backsheet color or implementation, such as for any one of the white-, black- and transparent solutions, as well as for mono- and bi-facial solutions. The backsheet reflector structure according to the present invention (of any color) can distribute light incident thereto at larger angles (at the angles on incidence exceeding the angle of Total Internal Reflection; angle of incidence>TIR angle) and recycle the light inside a solar panel module (1002, FIG. 2), thus increasing panel efficiency by about 4.0-5.5% (white backsheet) and about 5.0-6.5% (black backsheet).

Backsheet reflector gain for a reflector solution described hereby is better than for a conventional white reflector solution and about 10 times better than for a conventional black reflector- or a transparent solution.

Glass-glass lamination with a bi-facial solution is the most beneficial. In such as a case, the present solutions' gain will be between 5%-10% depending on a spacing area distance.

The present solution optimizes material cost and the spacing area in order to minimize the cost per Watt.

Optimal gain provided by the present solution in the PV module (60 cells) can be about 25 W-35 W.

The expression "a number of" refers herein to any positive integer starting from one (1), e.g. to one, two, or three. The expression "a plurality of" refers herein to any positive integer starting from two (2), e.g. to two, three, or four.

The terms "first", "second" and the like do not denote any order, quantity, or importance, but rather are used to distinguish one element from another.

The term "light" refers to electromagnetic radiation such as visible light but being not limited to visible light.

The terms "solar" and "photovoltaic", with regard to (solar) cells, related panel and modules, are used interchangeably.

In some instances, the optical structure according to the embodiments is referred to as an "ICS solution" or "ICS".

BRIEF DESCRIPTION OF THE DRAWINGS

Different embodiments of the present invention will become apparent by consideration of the detailed description and accompanying drawings, wherein:

FIG. 1A illustrates a conventional white backsheet reflector solution; and FIG. 1B illustrates an optical structure (a backsheet reflector structure) according to some embodiments.

FIGS. 7A-7E show simulation concepts for a reflector based on the optical structure according to various embodiments.

DETAILED DESCRIPTION OF THE EMBODIMENTS

Figure 2:
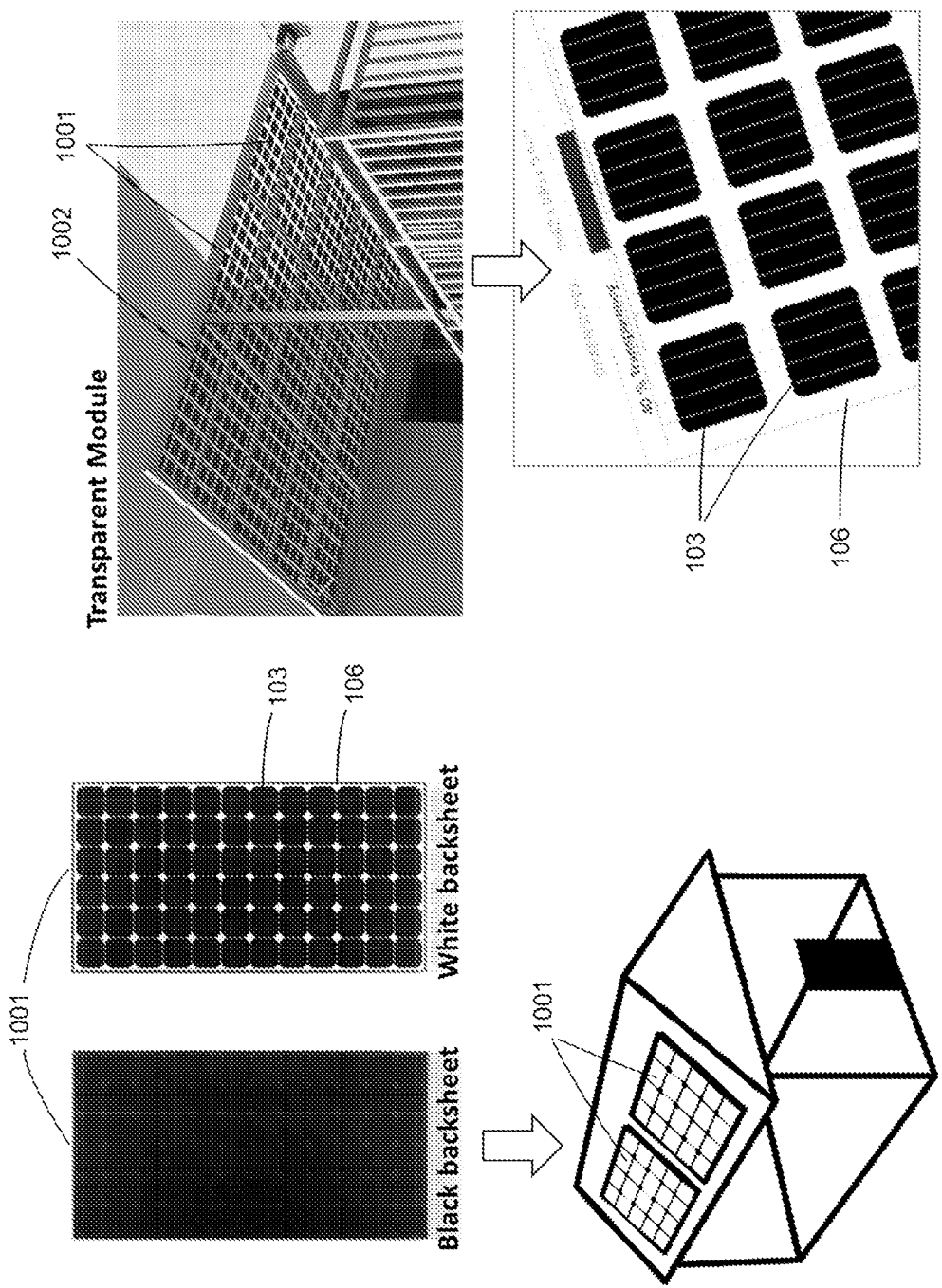
FIG. 2 shows a variety of general solar panel module colors by backsheet reflectors.

An integrated optical structure 100, 200 is hereby provided, comprising a flat, planar base element 106, 206; and at least one flat, planar carrier element 104, 204. The base element 106, 206 is advantageously configured as an entirely flat, planar layer without the pattern thereon. The carrier element 104, 204 is, in turn, provided, on at least one face/side thereof with a plurality of surface features, such as surface relief profiles 111, 121 with associated recessed profiles (cavity profiles) 112, 121 between the (protruding) relief profiles. Before the layers 106, 206 and 104, 204 are joined together, the cavities are open. Both elements 104, 204 and 106, 206 have uniform surfaces, i.e. the (protruding) profiles 111, 121 have the same height.

The elements 104, 204 and 106, 206 being flat and planar, the terms "element" and "layer" are used interchangeably or in combination.

The relief profiles and recessed profiles (cavity profiles) are arranged into an at least one pattern. The carrier element(s) and optionally the base element are substantially optically transparent. In the optical structure, said at least one carrier element 104, 204 is laminated together with the base element 106, 206 such, that an at least one embedded, optically functional cavity pattern 110, 210 is established at an interface between the elements 104, 204 and 106, 206, accordingly.

The optical structure may comprise more than one carrier element 104, 204 laminated together and/or with the base element 106, 206.

The optical structure 100, 200 is rendered optically functional by adjusting cavity profiles within each said embedded pattern and/or within each said carrier element, wherein an optical function is selected from light reflection, light refraction and light redirection.

An exemplary optical structure solution 100 comprising a transparent-, white- or black backsheet reflector layer 104 is shown on FIG. 1B (cavity optics is not shown).

By being thin, we refer to a scale of between of few microns, e.g. 5-50 microns, to a number of millimeters (e.g. 1-20 mm). Even larger sizes may be applied.

In some instances, a surface relief pattern and/or related features (open and/or embedded) can be substantially of submicron size regarding the length, depth/height and/or width thereof. Alternatively, the size of any feature and/or the pattern may be few microns or several tens of microns, e.g. about 20 or about 30 microns up to a number of millimeters.

In various embodiments of the present invention, one or more elements of the optical structure may be substantially optically transparent, translucent or opaque. The required degree of transparency of each element naturally depends on each particular use case. For example, in some embodiments the preferred transmittance in relation to predetermined wavelengths of light (e.g. infrared, visible, or UV) may reside within the range of about 80 to 95%, for instance, for a material considered as substantially optically transparent in that context.

Figure 3A:
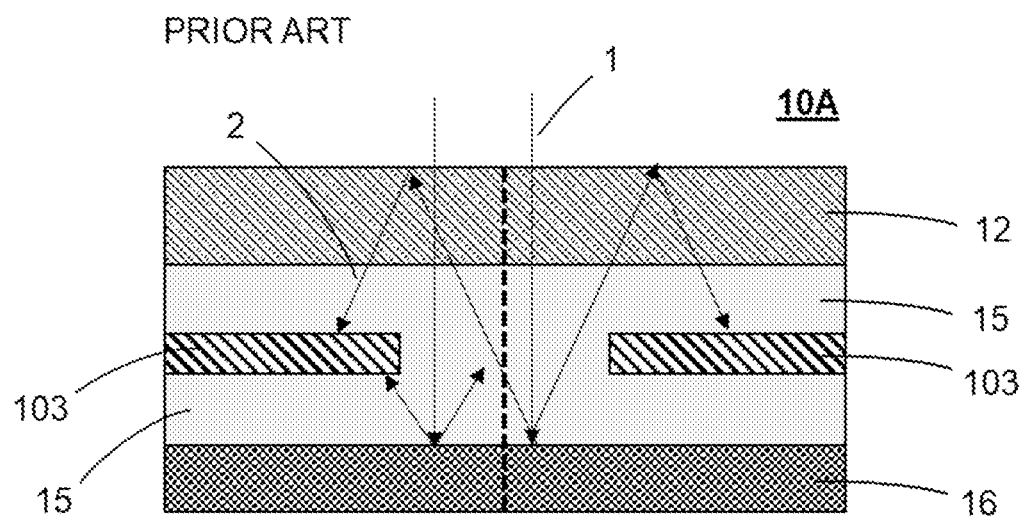
FIG. 3A shows a conventional optical structure, such as a backsheet reflector.

The optical structure configured as a thin reflector layer provided in a solar panel or module can reflect, direct and distribute light better than a module with the conventional backsheet reflector, such as an exemplary white reflector (as shown on FIG. 3A, for example). Improved optical function is attained by provision of patterns 110, 210 with cavity optics. The optical structure, in particular, the base element/ the backsheet layer 106, 206, can have different colors, such as white, black or other colors or it can be completely transparent. Still, whatever is the color of the base layer, the optical function, such as reflectivity, of the structure 100, 200 is attained by cavity optics.

In some embodiments, the optical structure thus comprises the base element 106, 206 imparted with a predetermined color. In some configurations, the base element can be provided as a black element. In alternative configurations the base element can be provided in white color or in any other, than black or white, color. Reference to any particular color (black, white etc.) is made according to general perception of the above indicated colors by human eye.

The patterned carrier element 104, 204 is preferably made of optically transparent material.

An optical element configured as the optical structure describe above is further provided. The optical element is configured as a reflector element, preferably, a reflector for a solar (PV) panel, optionally, as a backsheet reflector. The reflector can be configured as a stripe reflector 200A, 200B, 200D, partly 200C positioned at a level of PV cells for energy gain (e.g. light energy). The solution allows for minimizing consumption and costs of materials. Advantageous solutions may include positioning the structure 100, 200 at a level of a top surface of the PV cell By the term "stripe" we refer hereby to the optical structure (the reflector element) configured as an elongated, narrow piece of material, such as band, tape or strip.

Hence, the optical structure is further provided comprising a number of laminate layers configured as an entirely flat, planar base element 106, 206; and an at least one flat, planar carrier element 104, 204. The carrier element 104, 204 comprises, on at least one face/side thereof with a plurality of surface relief features, such as (protruding) surface relief profiles 111, 211 with associated recessed profiles (open cavities) 112, 212 between the relief profiles. The surface relief features, such as (protruding) profiles and (open) cavity profiles are arranged into an at least one pattern. The carrier element(s) and optionally the base element are substantially optically transparent. In the optical structure, said at least one carrier element 104, 204 is laminated together with a base element 106, 206 such, that an at least one embedded, optically functional cavity pattern 110, 210 is established at an interface between the elements. The optical structure is rendered optically functional by adjusting optical profiles, such as cavity profiles, within each said embedded pattern and/or within each said carrier element, wherein an optical function is selected from light reflection, light refraction and light redirection, the optical structure being disposed between photovoltaic cells in a solar photovoltaic panel. It is preferred that such optical structure is configured in the form of an elongated piece of material, such as an elongated stripe.

Thus, by modifying said optical profiles (cavity profiles and associated relief profiles between the cavities), in terms of any one dimensions, shape, orientation, alignment and periodicity thereof within a single pattern or in different patterns, the pattern or even a single cavity can be provided with its own, predetermined optical function or several functions, such as light coupling and reflection. The latter is referred to as an internal reflection or light trapping. Hence, optical profiles can be varied, in terms of any or all the aforesaid parameters, within a single pattern or within the pattern carrier layer (the patterned element).

It is preferred that said embedded cavities are filled with an internal medium having refractive index different from the refractive index of a medium material surrounding said cavities.

The internal medium material for said embedded cavities can be provided in fluidic or solid form. In In further instances, said internal medium fluidic material is selected from the group consisting of: air, gas, and liquid.

The cavity profiles are adjustable/variable in terms of at least one of their dimensions, shape, orientation, alignment and periodicity. It is clear that whether the cavity profiles are adjusted/altered, the associated (protruding) relief profiles are adjusted accordingly.

The carrier element(s) and optionally a base element can be made of a polymeric material, selected from the group consisting of: PET (polyethylene terephthalate), PEN (polyethylene naphthalate), PC (polycarbonate), PMMA (polymethyl methacrylate), PS (polystyrene), COP (cyclic olefin polymers), PI (polyimide), PEI (polyethylenimine), and PEEK (polyether ether ketone. Plastic material can be preferable in terms of at least manufacturing costs.

The carrier element(s) and optionally a base element can be made of glass.

In the optical structure, said embedded, optically functional cavity pattern 110, 210 is configured to provide symmetric or asymmetric reflection performance in a single direction, in two directions or in a plurality of directions.

In particular for solar cell applications, it is preferred that the optical structure is configured to receive light incident thereto at angles exceeding an angle at which total internal reflection occurs, and to further apply the optical function onto light received at such large angles of incidence.

Figure 3B:
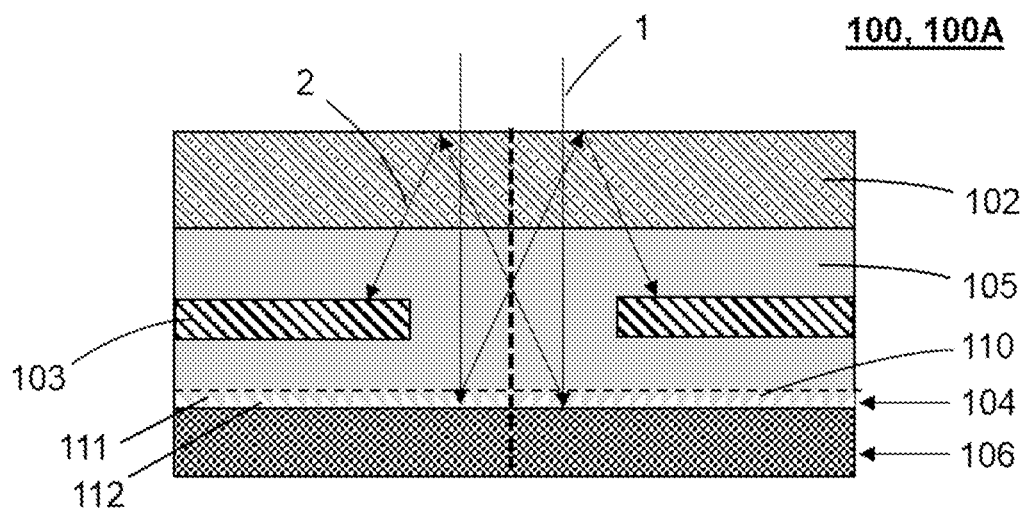
FIGS. 3B-3G show optical structures according to various embodiments.
Figure 3C:
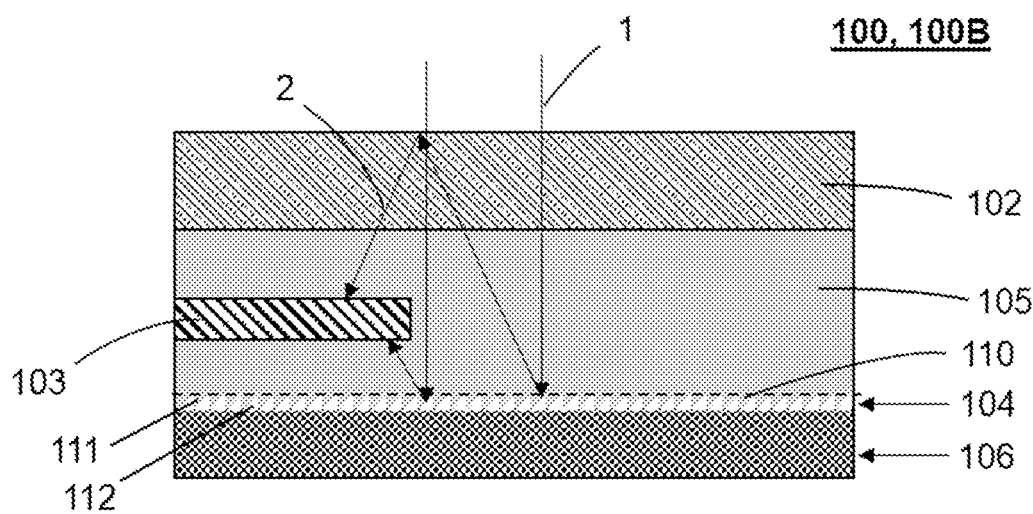

In some embodiments, in the optical structure, the embedded, optically functional cavity pattern or patterns are disposed below the photovoltaic cell material (cell 103) and/or above said photovoltaic cell material. Examples of such embodiments are illustrated by FIGS. 3B and 3C.

Is some embodiments, the embedded, optically functional cavity pattern or patterns are disposed such as to align with a surface of a photovoltaic cell or cells 103 in a solar photovoltaic panel. Examples of such embodiments are illustrated by FIGS. 3D-3G.

The cavities (open or embedded) provided in the carrier element or elements can be configured as grooves, symmetric or asymmetric, such as continuous grooves or discrete grooves, microlenses, dots, recesses, pixels, gratings, and the like.

It is preferred that the optical structure is configured as a film, preferably, a thin film. Thin film implementation covers also the structure configured as an elongated strip that surrounds the PV cells.

FIGS. 3B-3G describe different variants of the optical structure according to the embodiments and show disposition of said optical structure within an exemplary solar panel with regard to solar cell(s) 103. For the sake of clarity, we note that the reference numbering 100 (100A, 100B) and 200 (200A, 200B, 200C and 200D) is intended to mark, on FIGS. 3B-3G, the optical structure comprising the layers 104, 106 and 204. 206, accordingly. Solar cells 103, front and rear cover layer(s) 102, 102A and adhesive layer(s) 105 are shown for explanatory purposes to illustrate a position of the optical structure in the solar panel stack.

It should be clear for a skilled person that optical structure and/or the individual features within said optical structure can be independently adjusted, within each embodiment and/or between related embodiments, to meet needs and requirements implied by a particular design and/or application.

FIGS. 3B and 3C illustrate at 100A and 100B accordingly, the optical structure embodied as a backsheet reflector, in where the optically functional pattern 110 is disposed below photovoltaic cells 103.

FIG. 3B thus illustrates the optical structure 100A comprising a base element layer 104 (a backsheet reflector layer) and a carrier element layer 106 configured as a backsheet reflector, wherein the carrier element 104 comprises the optical pattern 110 with cavity optics 112 (the relief profiles are marked by numeral 111). The optical structure 106, 104 is further laminated with a conventional adhesive 105, e.g. EVA. The optical structure 100A (hereby, meaning the optical structure comprising the layers 104, 106) is hereby laminated at the bottom of the stack. The backsheet reflector layer/the base layer 106 can be white, black or any colour or transparent, for example. Said coloured base layer 106 is thus laminated with the optically transparent patterned (110) carrier element 104 to form cavity optics. Cavity profiles are marked by the reference numeral 112 and the (protruding) relief profiles are marked by the reference numeral 111. Choice of a visible colour depends on the filling factor of cavity optics; the higher is the filling factor, more haziness in colour is utilized. Design of cavity optics can contain different cavity profiles in the same pattern (different in at least in dimensions, shape, alignment, periodicity, etc.), which difference defines at least one optical function relative to incident light, said function being selected from at least light reflection, light directing and light distribution.

Figure 3D:
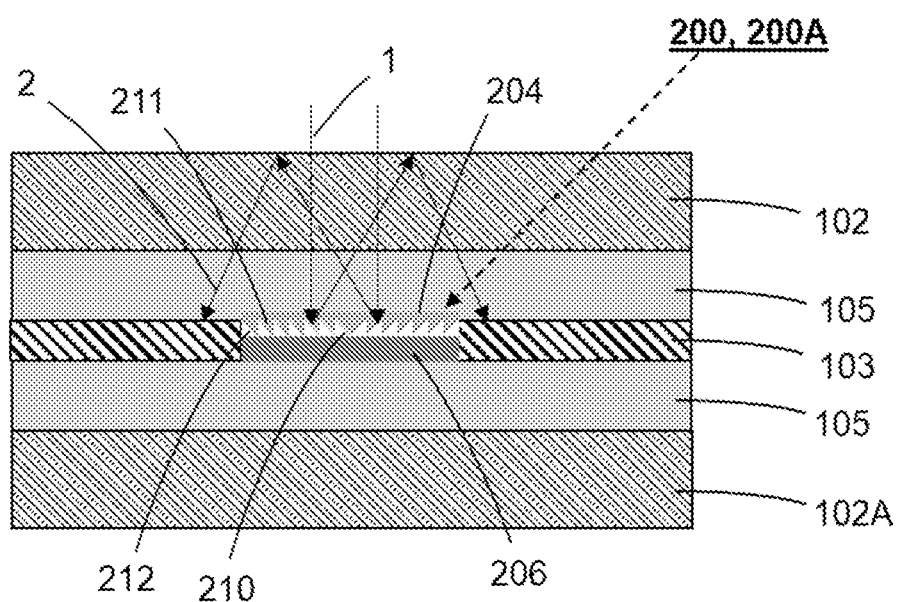

The optical structure can thus be fabricated with two directional grating periods for the space between the PV cells, in which the left side pattern is reflecting and redirecting light to the right side and the right side pattern does the same to the left side (see e.g. FIG. 3D). Naturally, the design can differ from one another in order to provide determinate light reflection distributions, such as 3D distribution, for example. Also, variable pattern areas can be utilized, depending on an assembly angle and orientation vs. position of sun.

FIG. 3C shows the optical structure 100B comprising the base element layer 104 (a backsheet reflector layer) and the carrier element layer 106 configured as a backsheet reflector. The carrier element 104 comprises the optical pattern 110 with a plurality of optical cavities 112 (the relief profiles are marked by numeral 111). The optical structure according to FIG. 3C is particularly suitable for utilization at the edge of the PV module. For these reasons, it may be preferred that the optical structure of FIG. 3C contains a unidirectional pattern 110. This maximizes incident light 1 capturing at the edge area and redirecting thus captured light 2 onto the cell 103 surface, but not to a frame of the module, which absorbs light.

The optical structure 100A, 100B (FIGS. 3B, 3C) configured as a reflector layer is utilized in the same manner than the one disposed between the cells (described further below with reference to FIGS. 3D-3G). The optical structure according 100A, 100B can be implemented to cover the entire PV module area or only the edge area and the space (spacings) between cells. Colour solutions are the same as what is mentioned hereinabove. Lamination and manufacturing methods are preferably based on roll-to-roll methods and automated formation of an assembly from the roll.

FIGS. 3D-3G show the optical structure, according to some embodiments, said structure being preferably configured in the form of an elongated piece of material, such as an elongated stripe, disposed between the photovoltaic cells 103 in the solar photovoltaic panel.

FIG. 3D shows the optical structure 200A, according to some embodiment, provided as a stripe reflector, said structure comprising the base element 204 (a backsheet reflector layer) and the carrier element 204. The carrier element comprises at least one optical pattern 210 based on cavity optics as described herein above. The optical structure is provided as a stripe reflector disposed between the solar cells 103 and further laminated between cover (sealing) layers 102, 102A, such as e.g. glass (top, 102) and e.g. glass or polymeric film (bottom, 102A) by means of polymeric layers 105, such as EVA layers. Provision of the layers 102, 102A, with regards to top and bottom positioning, can be other way around, dependent on the design. In this stack, the optical structure 200A is positioned at a level of the PV cells 103 (essentially between the cells), whereby the optical pattern(s) are provided close to the surface level of PV cells. Such placement is beneficial since more light can reach the photovoltaic cell surface and improved energy gain can be attained. The most of light is thus redirected to the PV surface and not trapped at the edge or at the backside. This reflector stripe has optimal position and does not need any extra layers for lamination, only conventional top and bottom adhesive, e.g. EVA, lamination layers 105. The assembly can be executed by an automated robotic system. The base layer 206 can be provided in white, black or any other colour; or it can be transparent. The carrier layer 204 is generally transparent; therefore, the colour of the base layer 206 determined the colour of the optical structure/the reflector stripe. Whether both elements 204, 206 are transparent, the optical structure (the stripe) is both a reflector and a transmission element. This is beneficial, especially for bi-facial PV cells. The pattern 210 can be designed in accordance to what is mentioned herein above.

Figure 3E:
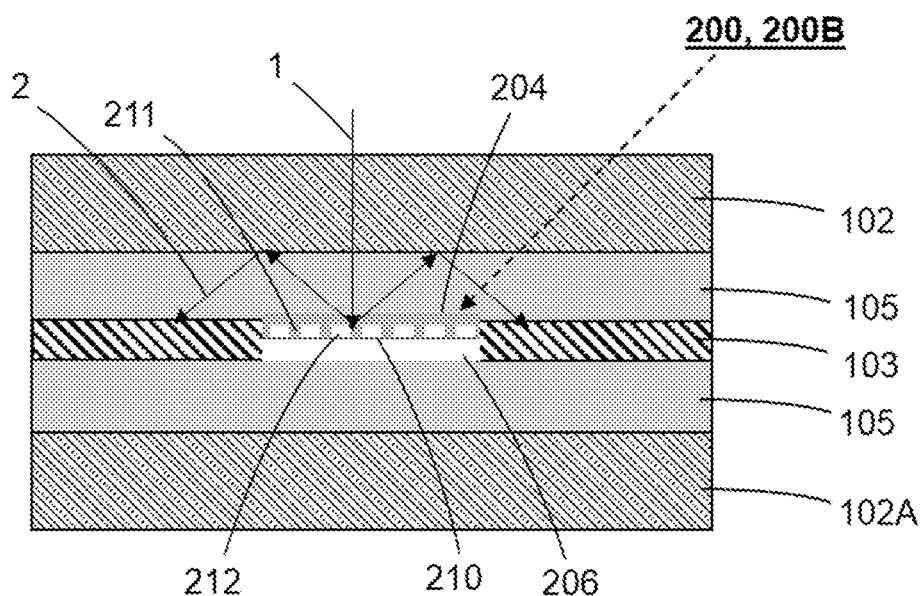

FIG. 3E shows the optical structure 200B, according to some embodiment, provided as a stripe reflector, said structure comprising the base element 204 (a backsheet reflector layer) and the carrier element 204. The carrier element comprises at least one optical pattern 210 comprising optical cavities 212 (associated relief profiles are marked by 211). The optical structure 200B is thus configured as a stripe layer, laminated between the polymeric (EVA) layers 105, as disclosed above, at the level of PV cell 103 surface. In this stack configuration, the optical structure 200B preferably has a white base element layer 206, which is laminated together with the transparent patterned element 204 to form embedded cavity optics. The pattern 210 can contain binary gratings, dots, regresses, microlenses or other profiles in order to redirect and diffuse the incident light better than a conventional white reflector. This solution is gaining more light on the PV cell 103, whereby the PV cell/panel has improved energy efficiency. This stripe may have also optical patterns on both sides of the base element 206, on the top and on the bottom (back-) side (in a manner shown on FIG. 3G), depending on type of the PV cell 103 (mono- or bi-facial). If the base element/film 206 is a white reflector, it provides a hybrid solution in terms of its optical performance, thus being capable to provide light distribution partially in predetermined orders of diffractive light and partially as Lambertian reflection, for example.

Figure 3F:
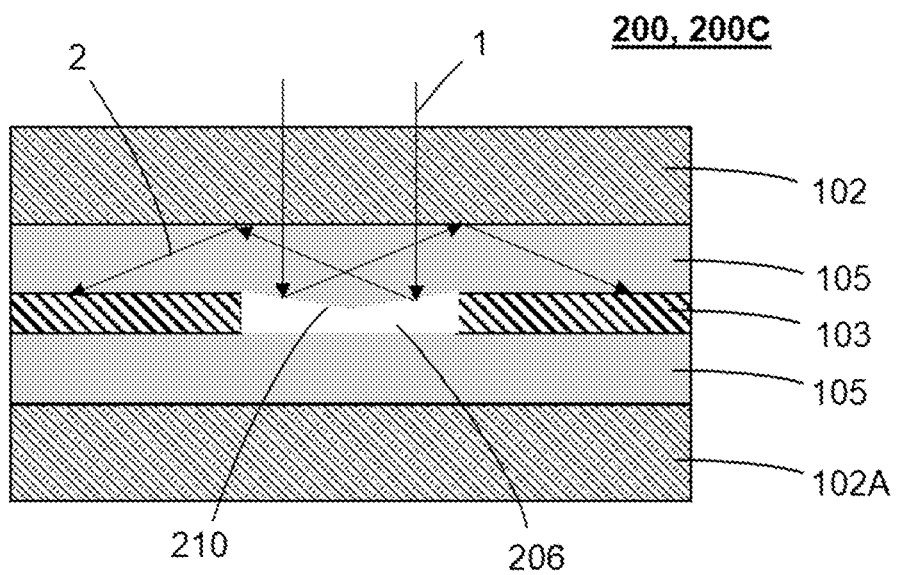

FIG. 3F shows the optical structure 200C, according to some embodiment. This is a stripe reflector layer configured as follows. Basic white reflector material provided as the base element 206 is utilized in the stripe format, which is laminated between the polymeric (e.g. EVA) layers 105, as mentioned hereinabove. The white stripe 206 can be flat in both sides (not shown) or it can be provided in an optical format to comprise an at least one optical feature (a shape/a profile) on one side or both sides in order to form determinate reflection distribution, which causes less light to be reflected out of the module and more light to be internally reflected to arrive at the solar cells 103. This performance is also based on hybrid optics, Lambertian reflection and refractive reflection. Stripe colour and size can vary. White colour may be advantageous, but in some cases other, than white, colour solutions can be utilized, due to utility (e.g. indication) and/or aesthetic issues, for example.

Figure 3G:
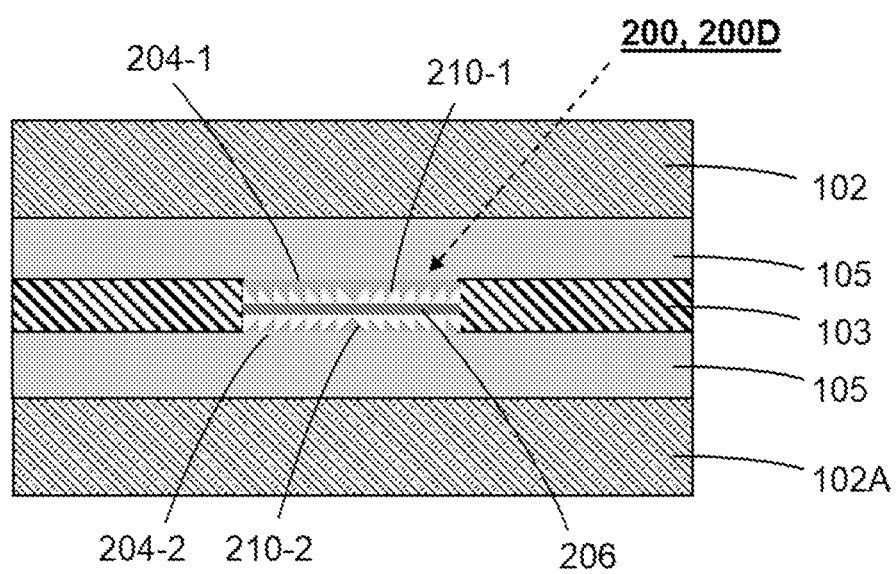

FIG. 3G shows the optical structure 200D, according to some embodiment, provided as a stripe reflector layer, as shown hereinabove. The topical structure 200D comprises the base element 206 and carrier elements 204-1, 204-2 placed at both sides (top and bottom sides) of the base element 206. Each carrier elements comprises at least one optical pattern 210-1, 210-2 based on cavity optics as described herein above. The patterns 210-1, 210-2 may vary. For example, the top pattern may be configured with the cavities of essentially triangular cross-section, whereas the bottom pattern may be configured with the cavities with essentially rectangular cross-section, or vice versa. Positioning of the patterned elements 204-1, 204-2 with regards to the base layer 206 depends on the type of PV cell 103 (mono- or bi-facial). In this stripe stack, the base layer 206 can be transparent or having white, black or any other colour, since the basic efficiency of this stack does not vary significantly with the change of colour. Even having the base layer in black version, the optical structure is energy efficient. Efficiency depends on pattern design and the filling factor (density of optical features in the pattern). FIG. 3G thus shows the optical structure, comprising two carrier elements 204-1, 204-2 laminated on each side of the base element 206, wherein at least one embedded, optically functional pattern 210-1, 210-2 is established at the interface between the base element 206 and each of the carrier elements 204-1, 204-2.

Figure 4A:
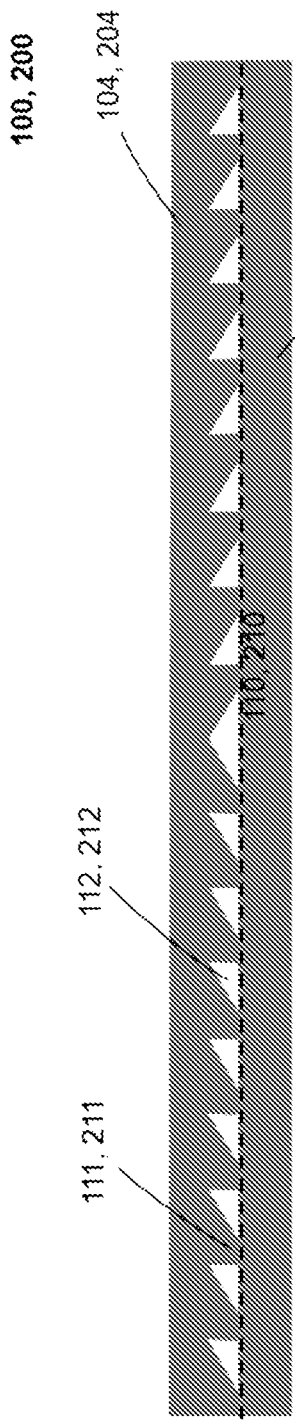
FIGS. 4A-4C shows stripe reflector solutions with different cavity optics orientation, according to different embodiments
Figure 4B:
Figure 4C:
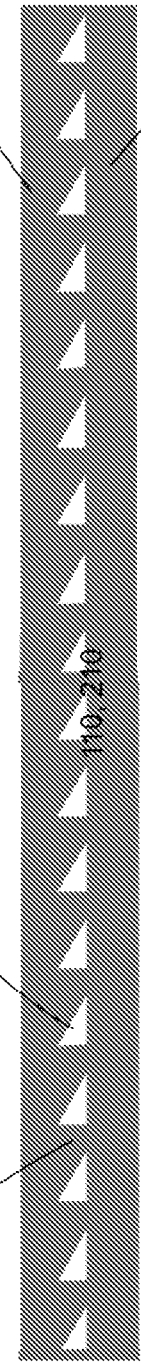

The optical structure 100, 200 optionally configured as a stripe reflector is further shown on FIGS. 4A-4D. Exemplary configurations on FIGS. 4A, 4B and 4C show different orientations for optical cavities 112, 212 within the embedded patterns 110, 210. In configurations of FIGS. 4A and 4B, a number of embedded, optically functional patterns 110, 210 are arranged side-by-side (hereby. left and right) such that the cavity profile of one pattern forms a mirror image of the cavity profile of the adjoining pattern. Similar solutions are presented on FIGS. 3D and 3G. FIG. 4C presents a monodirectional pattern (similar to that shown on FIGS. 3B, 3C and 3E).

Figure 4D:
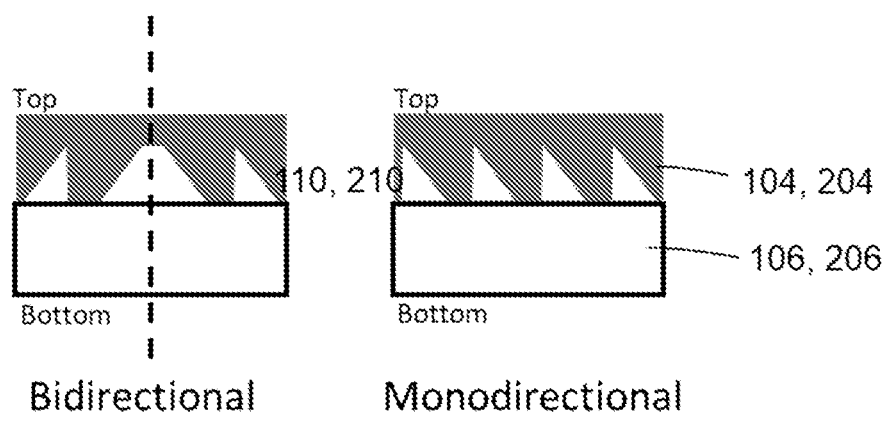
FIG. 4D shows bi-directional and monodirectional patterns.

FIG. 4D shows a difference between a monodirectional pattern (on the right) and bidirectional pattern (on the left). The layer 104, 204 optionally configured as a film can be transparent, translucent and/or colored. Both mono- and bidirectional configurations are advantageous for use in solar modules. Still, the monodirectional configuration can be manufactured with less effort.

The optical structure 100, 200 is provided as a fully integrated, embedded cavity optics solution. Although an interface between the layers 104, 204 and 106, 206 is shown by a dashed line (e.g. FIG. 4A), the established structure 100, 200 should be viewed as a solid, integrated entity.

Figure 5A:
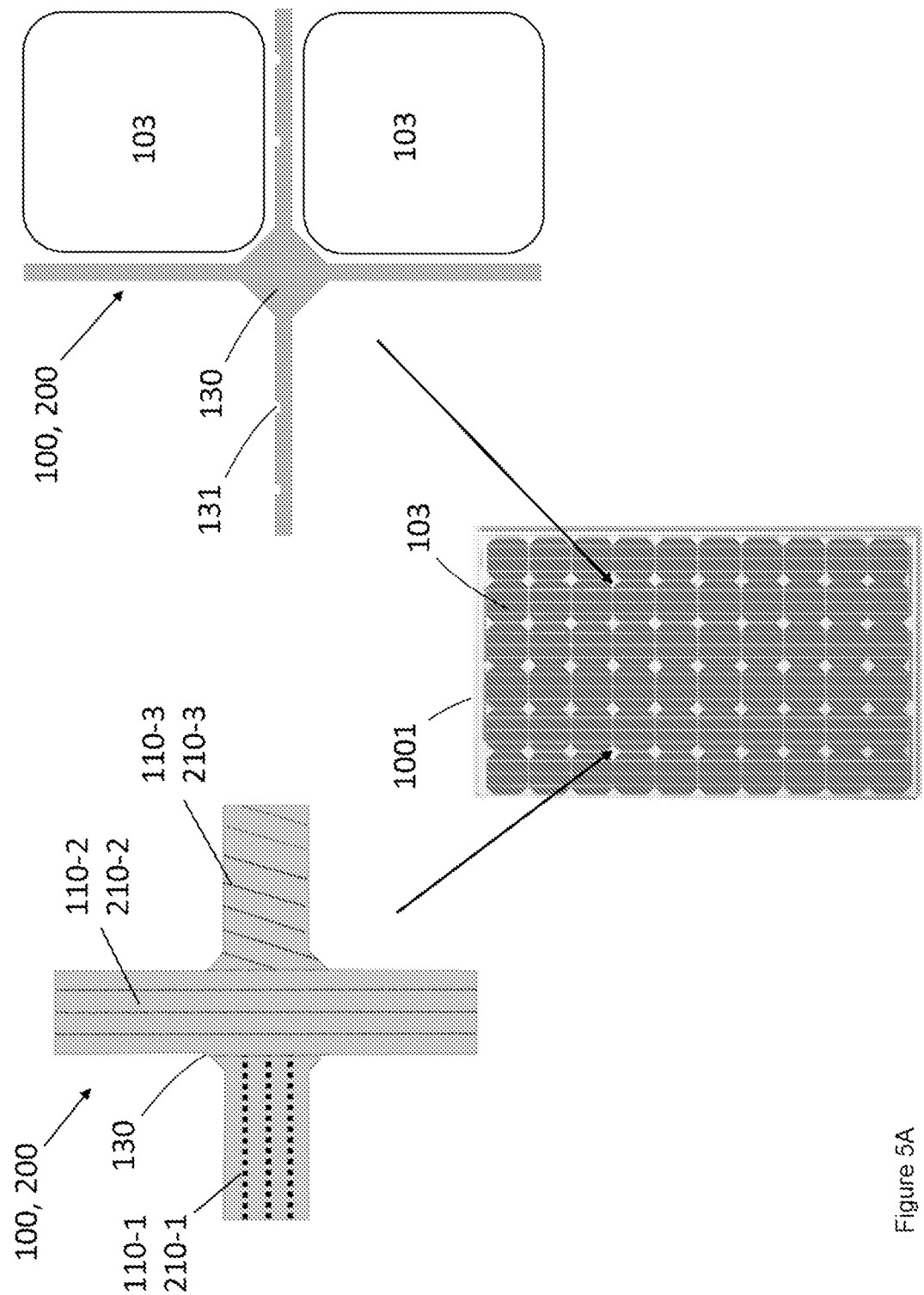
FIG. 5A shows an arrangement of the optical structure, according to some embodiments, in a PV panel.

FIG. 5A illustrates the optical structure 100, 200 provided as a stripe solution arranged between photovoltaic cells 103 in the panel 1001 in a crosswise manner.

On the right, an arrangement of the solar cells 103 with regard to an interconnecting (cross-section) point 130 (hereby, between four cells 103) is schematically shown. Reference numeral 131 indicates connection wedges for electrical connections between the cells 103. On the left, a stripe solution is shown that includes three different patterns 110-1, 110-2, 110-3 or 210-1, 210-2, 210-3 overlaid at the cross-sections 130 between the cells 103.

Various solutions can thus be implemented in the same solar panel 1001 or different solar panels. FIG. 5A shows an exemplary solar panel 1001 for 60 PV cells. Thus, a reflector layer A can be provided in the form (cut format) suitable for an assembly including different local optical pattern options and orientation (assembly on the left comprising the patterns 210-1, 210-2, 210-3, for example). Additionally or alternatively, a reflector layer B can be provided in the form (cut format) suitable for an assembly including wedge connections 131 for electrical connections between the PV cells (assembly on the right). Additionally or alternatively, a reflector layer C can be provided in the form of a continuous narrow strip to cover interconnecting spaces between the cells and around the cells.

Figure 5B:
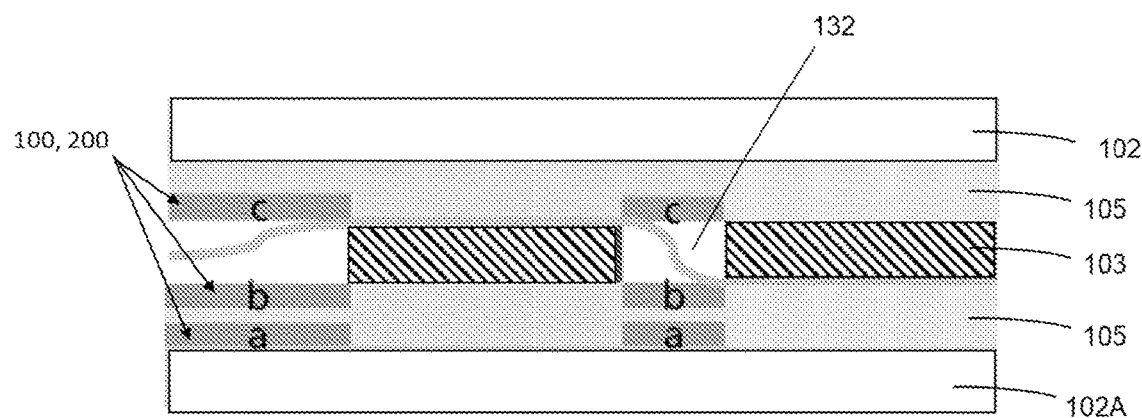
FIG. 5B shows different positioning of the optical structure in the PV module.

FIG. 5B illustrates positioning of the optical structure 100, 200 in an exemplary PV panel stack at different height with regard to a solar cell or cells 103. The structure 100, 200 can be positioned essentially on the rear cover 102A (position "a"), essentially at a level of the bottom surface of the solar cell 103 (position "b") and essentially at a level of the top surface of the solar cell 103 (position "c"). Position "c" may also be provided under the (front) cover glass, for example. In some instances, position "c" may be advantageous, as further discussed in relation with FIG. 9. Reference numeral 132 indicates a space between the cells 103.

Some solutions may include optical structures positioned at "a", "b" and/or "c" in a single panel/module. E.g. one panel/module can include the optical structures positioned only at "a", "b" or "c"; at "a" and "b", at "a" and "c"; at "b" and "c", or other combinations thereof. Positions "a", "b" and "c" can vary within a single module between the individual cells. Other positions, such as essentially between the cells are described herein above.

Figure 6:
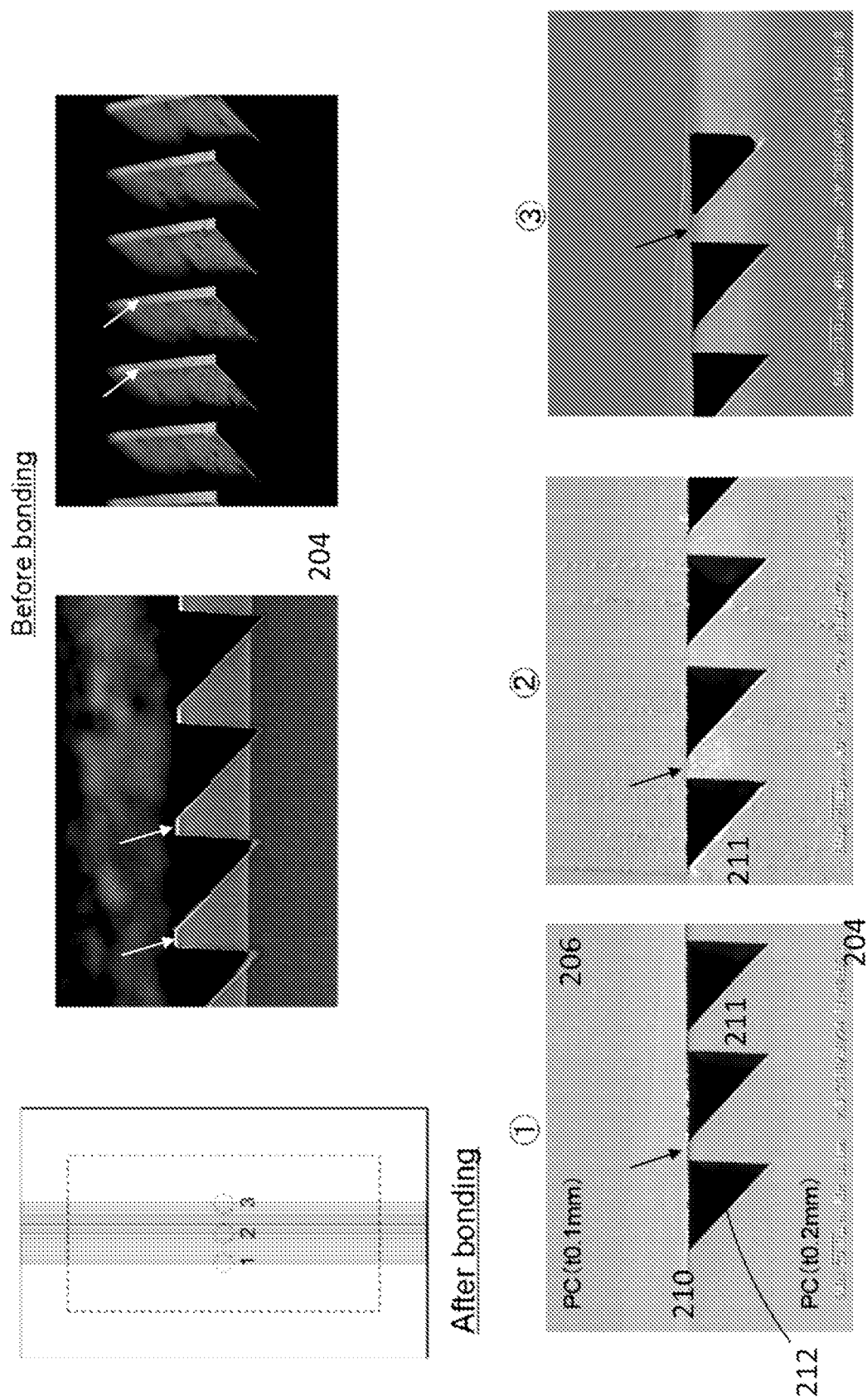
FIG. 6 shows the optical structure according to some embodiments, with a replicated pattern and air-cavities produced by bonding.

FIG. 6 shows a patterned layer 204 before and after joining to an entirely flat, planar base element 206, whereby embedded cavity profiles are formed upon such joining. Reference numbers shown for a variant 1 stand also for the variants 2 and 3.

A bonded film (hereby, a flat base element 206) can be transparent, white, black or any other color. Flat junction areas (shown by small arrows) are formed at the interface between the layers 204, 206. Said flat junction areas are formed by the fact that both the base element 206 and 204 are flat and planar. Thus, upon formation of recesses (open cavities) 212 on the patterned layer 204, the relief profiles 211 have flat surfaces. By virtue of the element 204 being planar, all relief profiles 204 have uniform height (i.e. same height). Upon joining the elements 204, 206 together, flat interface is formed therebetween by virtue of said flat junction areas.

Said flat interface concept is indeed applicable to the optical structure 100 with the layers 104 and 106.

Color of the base medium executes its function primarily via lamination (junction) points between the layers 204, 206 and secondly via cavity optics 212 (in such an event the color is hazier). To minimize haziness, cavity transparency can be improved by provision of antireflective (AR) sub-patterns or coatings on any one of the elements 204, 206 (104, 106).

FIGS. 7A-7E illustrate optical function simulation concepts obtainable with the optical structures 100, 200, according to various embodiments, said optical structures being disposed between two PV cells 103-1 and 103-2 at a 4 mm space in a manner schematically shown on FIG. 3D or 3E, for example. FIGS. 7A-7E illustrate simulations obtained with different configurations of the transparent optical structure.

Figure 7A:
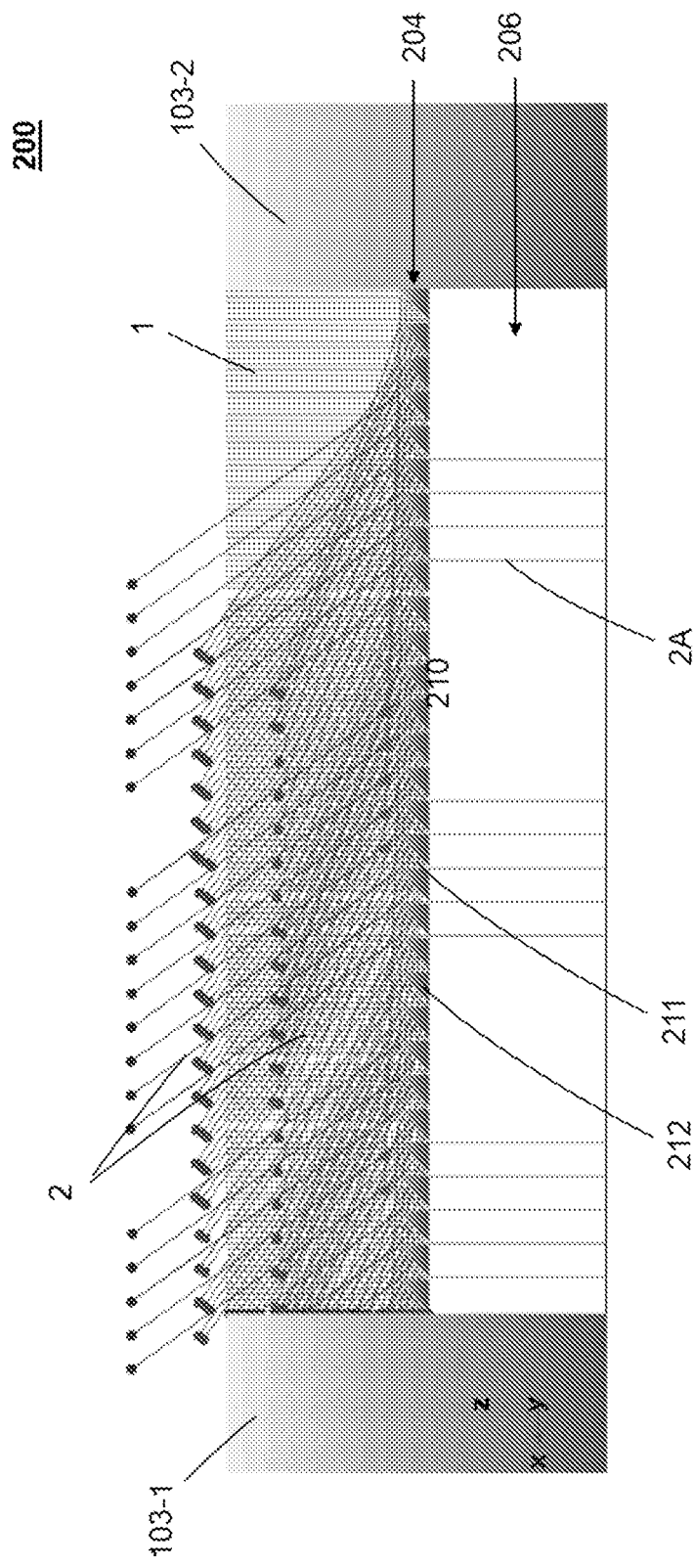

FIG. 7A is a simulation of an optical function obtainable with the transparent optical structure 200 disposed between two PV cells 103-1 and 103-2 at a 4 mm space, with the optical structure being placed at a determinate height. In this case the depth of the structure is around 800 micrometres (μm) (layers 204 and 206). Vertical light rays 1 are incident onto the panel from the top and hit the unidirectional pattern 210 provided on the carrier element layer 204. Reflected light 2 is mainly redirected to the left side. This simulation results demonstrate that remarkable part of the light hits a vertical edge of the cell 103-1, which results in a loss of light. Some light is transmitted thought the transparent optical structure. Efficiency gain in the present case is only 17%.

FIG. 7B presents a simulation concept similar to that presented on FIG. 7A, with the optical 200 provided at a 4 mm space between two PV cells 103-1, 103-2. Hereby, vertical light rays 1 are incident from the top and hit the carrier element layer 204 with a two-directional pattern 210 (which can be viewed as two patterns arranged according mirror-symmetrically). Reflected light 2 is redirected to the left and right sides. This simulation results demonstrate that remarkable part of light hits the vertical edges of the solar cells 103-1, 103-2, which results in a loss of light. In present case, height-to-width ratio of the optical structure pattern 210 with regard to the solar cell (its vertical edge) is not sufficient. Also, orientation of the functional pattern 210 is unfavorable for redirecting light over the vertical edge of the cell. Efficiency gain in the present case is again only 17%.

Figure 7C:
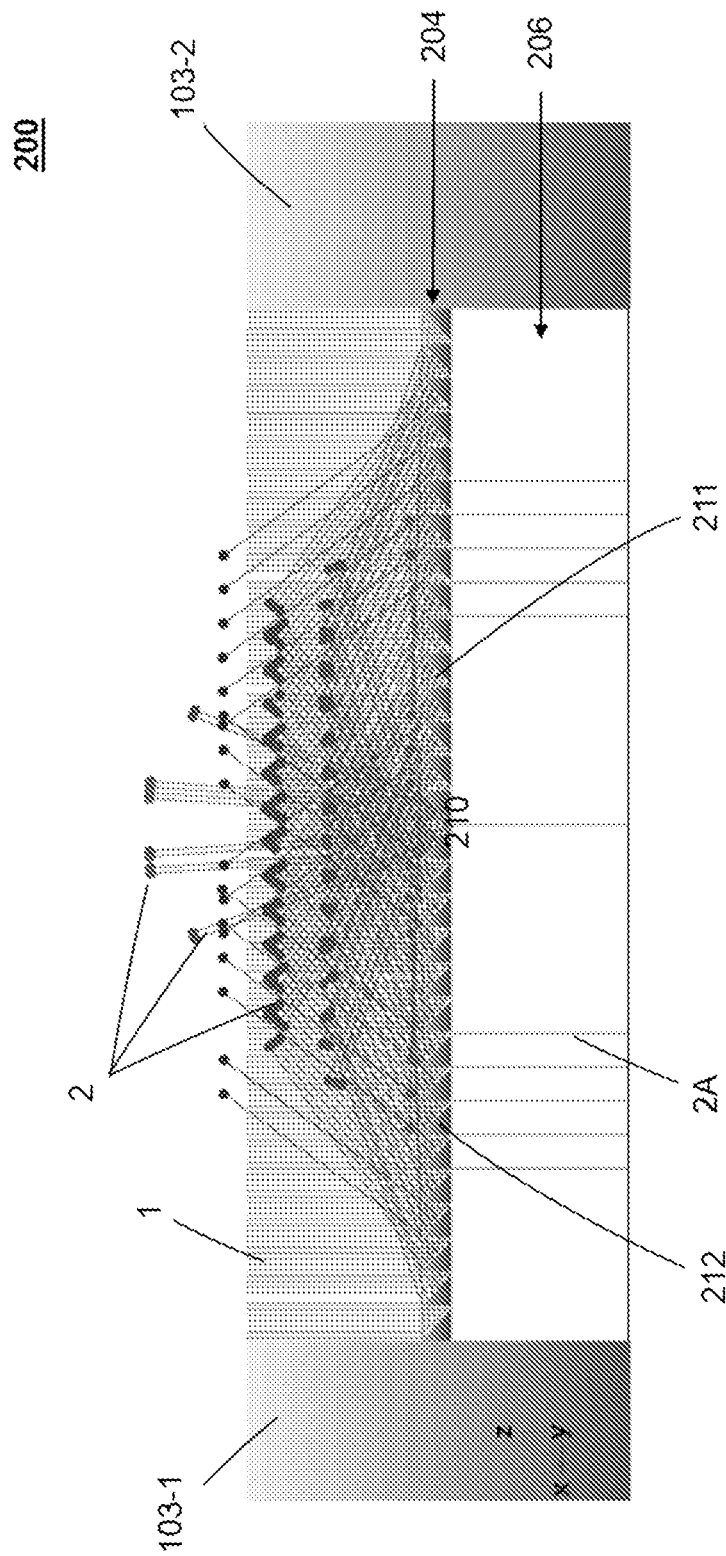

FIG. 7C presents a simulation concept similar to those shown on FIGS. 7A and 7B, with the optical structure 200 positioned at a 4 mm space between two PV cells 103-1, 103-2. Hereby, vertical light rays 1 are incident from the top and hit the carrier element layer 204 with a two-directional pattern 210 (which can be viewed as two patterns arranged according mirror-symmetrically). Reflected light 2 is redirected to the left and right sides; however, due to different orientation of the optical cavities 212 in the pattern, present orientation provides redirection with crossed light rays. Simulation results demonstrate that major part of light propagates at favourable angles, whereby light can proceed over the vertical edges of the cells to finally arrive at the surfaces of the PV cells. Orientation of the optically functional pattern 210 has thus a remarkable impact on light efficiency gain. Efficiency gain in the present case is more than 60%.

Figure 7D:
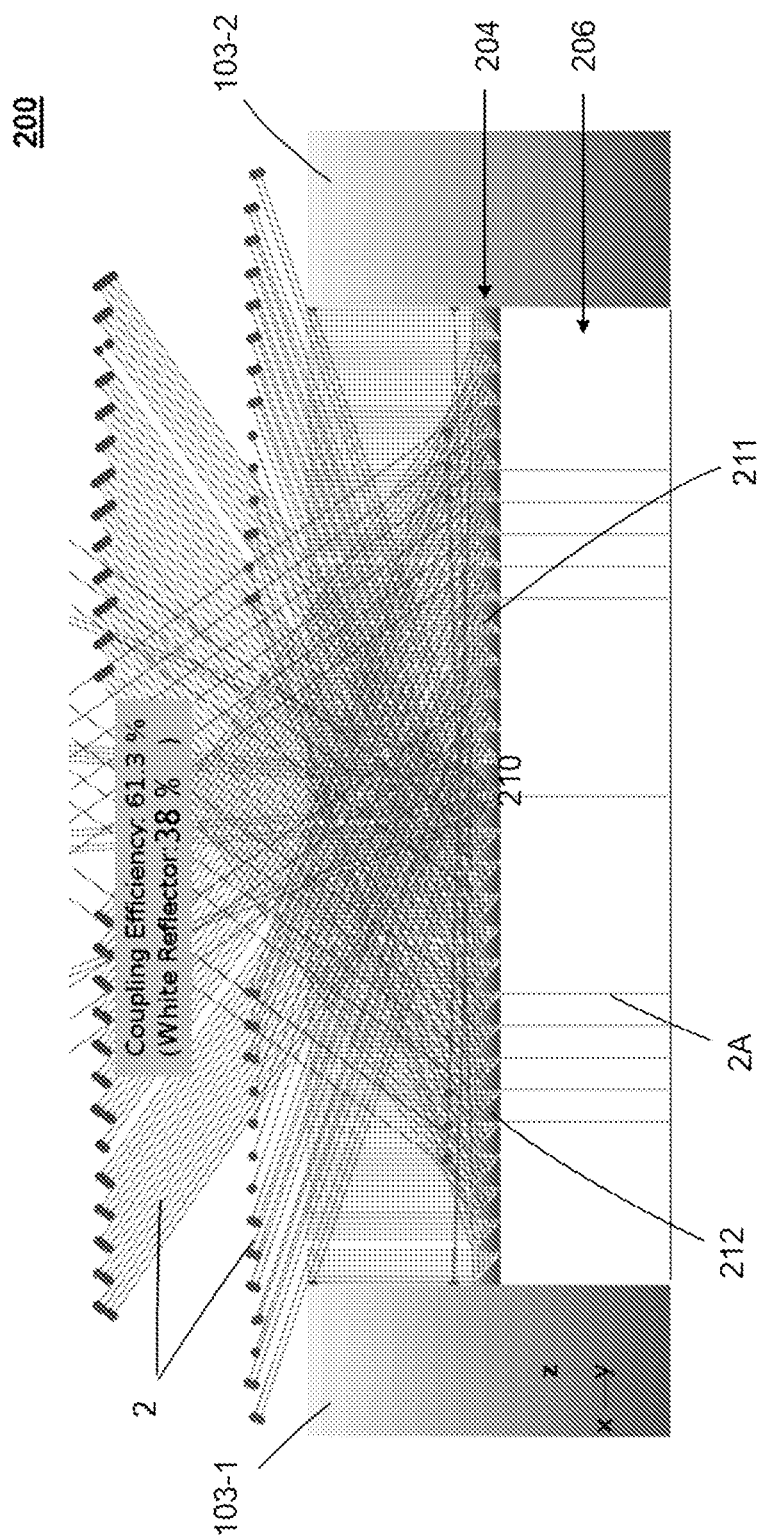

FIG. 7D presents the same simulation concept as on FIG. 7C, but shows a longer pathway for light propagation, i.e. how the light rays 2 reflected from the pattern 210 are passing over the vertical edge of the cells 103. This case provides light efficiency gain 61,3%, which is clearly higher than compared to a conventional white reflector having about 38% efficiency.

Figure 7E:
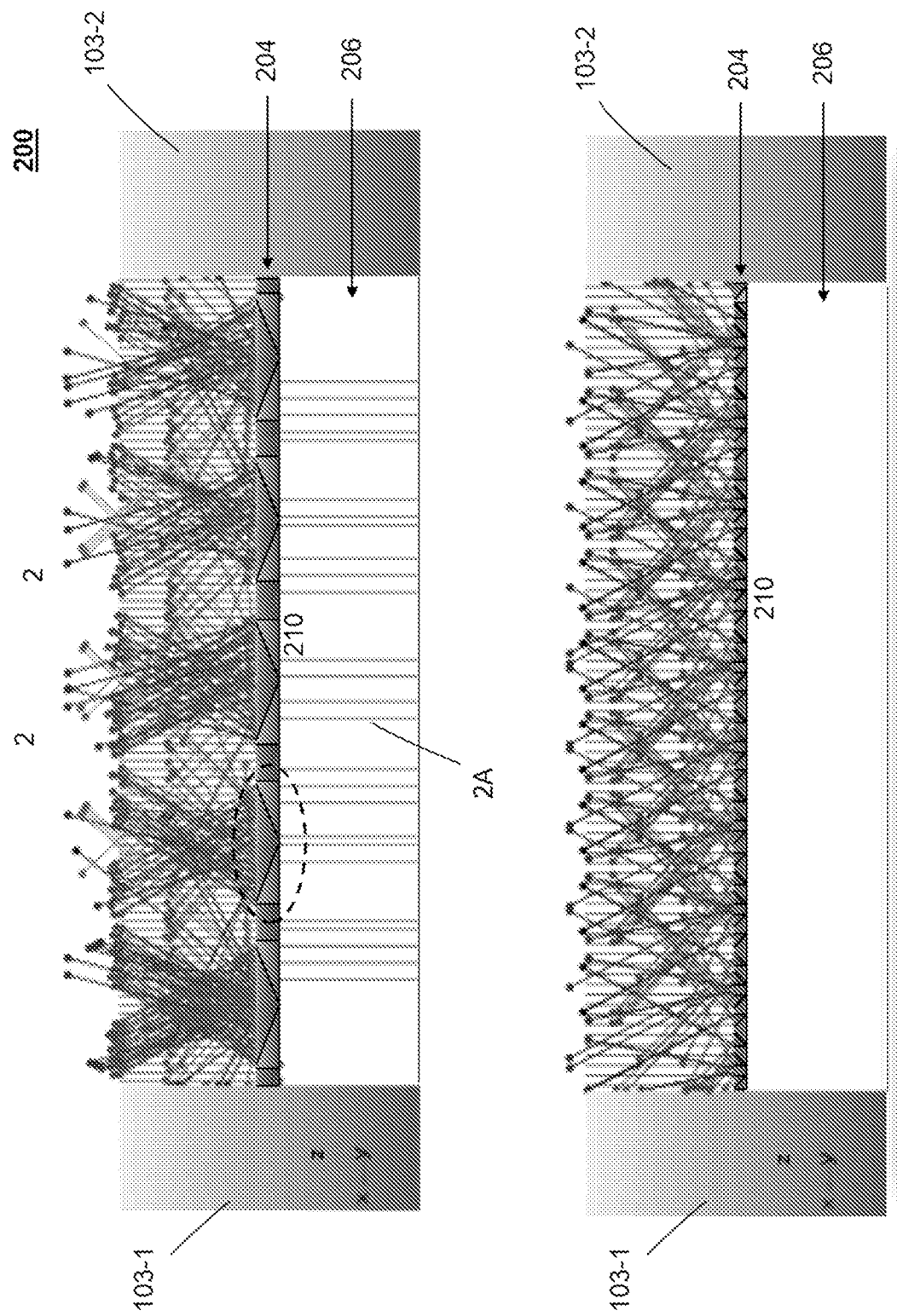

FIG. 7E presents a simulation concept similar to those shown on FIGS. 7A-7D, with the optical structure 200 positioned at a 4 mm space between two PV cells 103-1, 103-2. In this case, the optical cavity pattern 210 is symmetric, but utilizes a predetermined 3D shape, such as a zigzag grating cavity profile. Vertically incident light rays are redirected in each local area (dashed circle) for a favourable angle distribution, whereby light 2 reflected from the pattern 210 propagates upwards and over the vertical edge of the cell to finally arrive at the PV cell surface.

FIGS. 7A-7E illustrate example embodiments of the optical structure/backsheet reflector layer. When the optical structure is made optically transparent, some light (2A) is transmitted therethrough. This transmission can be minimized by utilizing a white reflector base layer 206 provided under the patterned carrier element layer 204, for example. Whether a reflective base-layer material should be used depends on the type of the PV cell in the panel (mono- or bi-facial). In such an event, light efficiency gain is also over 63,1%.

It should be noted that the arrangement shown on FIGS. 7A-7E is disposed inside a PV panel stack (layers 105, 102, 102A not shown), whereby the light rays 2 are internally reflected in the stack assembly (not back-reflected into the ambient).

Figure 8A:
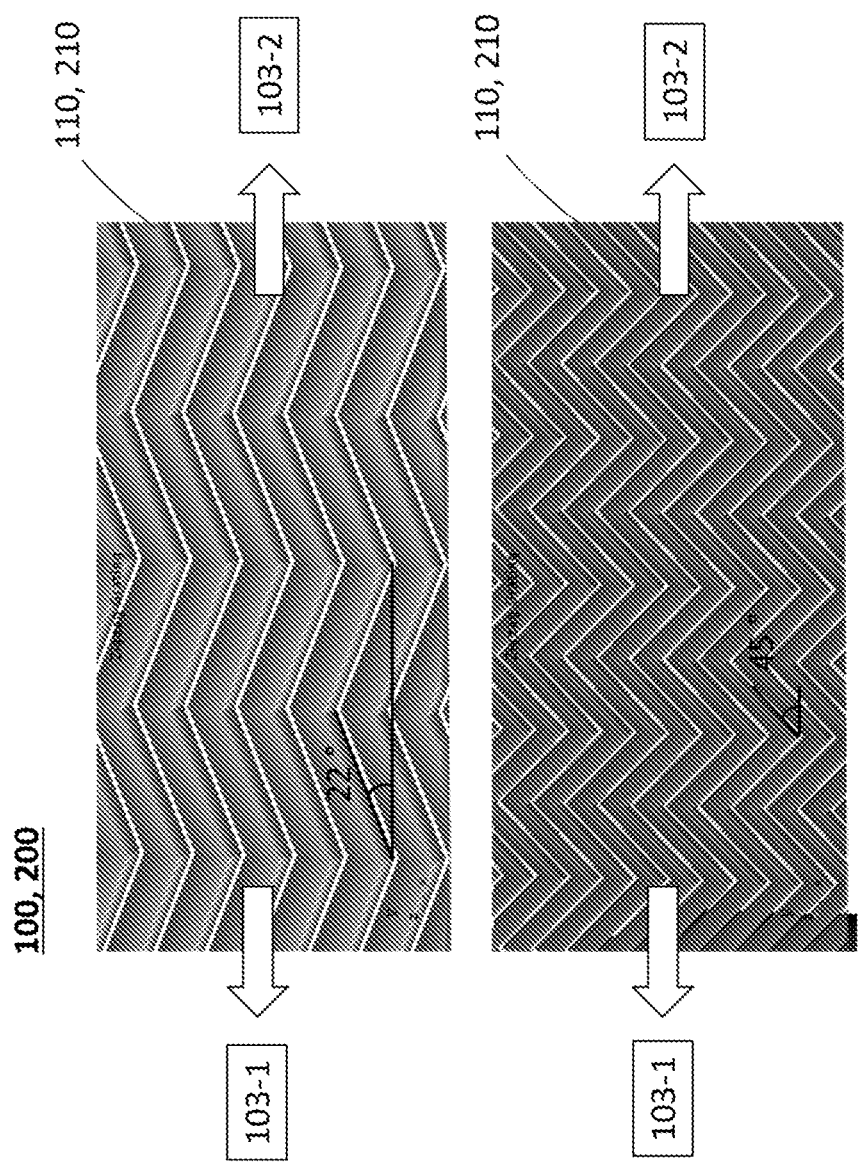
FIG. 8A shows a cavity pattern for the optical structure, according to some embodiment.

FIG. 8A presents the optical structure 100, 200, comprising cavity patterns 110, 210 based on a continuous zigzag grating configuration. Basic pattern profile parameters can be optimized for different uses/applications and orientations relative to incident light, such as sunlight. Two different models are simulated having a grating angle of 22 degrees (top) and 45 degrees (bottom). The optical structure(s) shown on FIG. 8 can be places between the solar cells 103-1, 103-2, in a manner disclosed above.

Figure 8B:
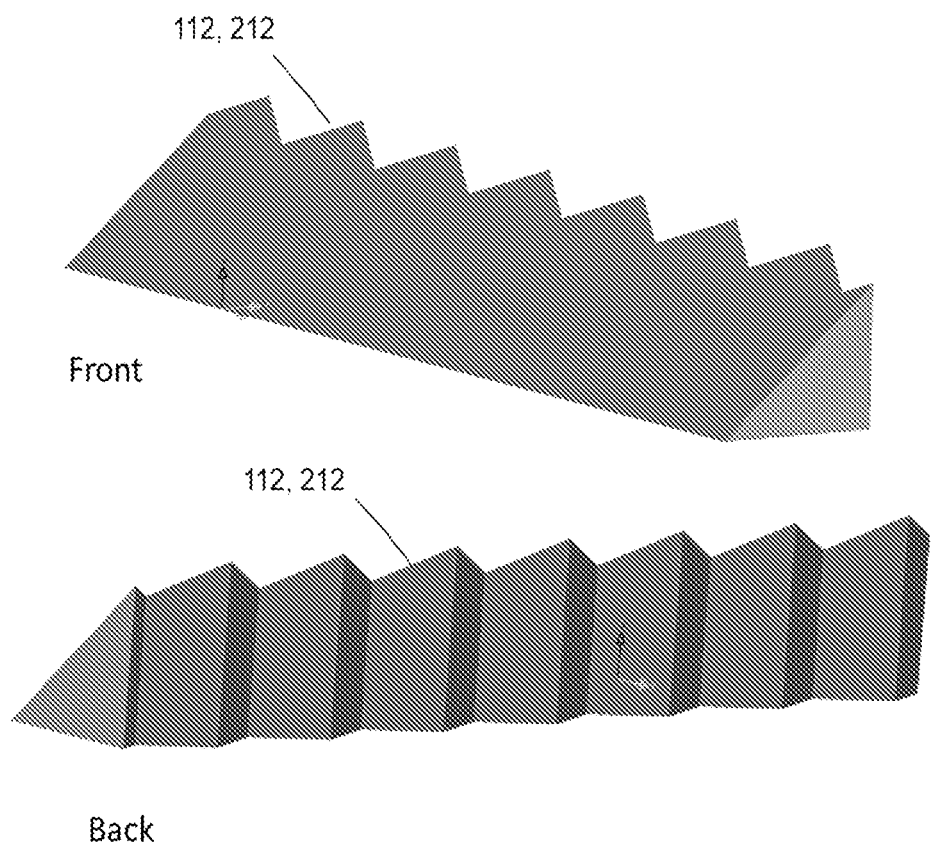
FIG. 8B shows a pattern profile according to an embodiment.

FIG. 8B shows an exemplary blazed cavity profile 112, 212 with a zigzag backside (front and back views). By using said profile; higher efficiency gain can be achieved in comparison with the linear blazed profile.

Figure 9:
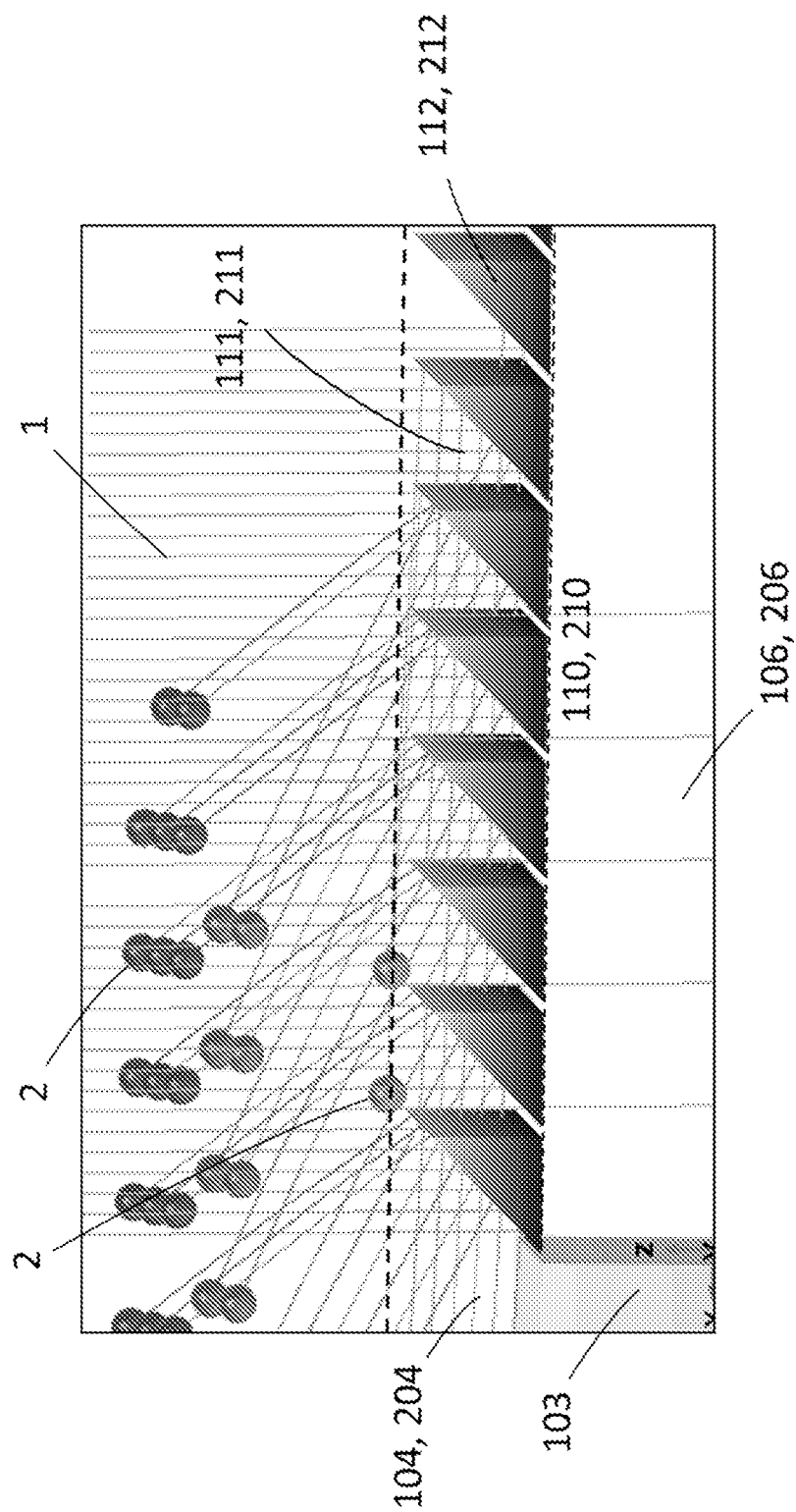
FIG. 9 illustrates a configuration comprising a stripe reflector based on the optical structure, according to some embodiment.

FIG. 9 shows a configuration comprising the optical structure configured as a stripe reflector with a white base element 106, 206 positioned at a level of the photovoltaic surface (top surface of the solar cell). Vertically arriving light rays 1 propagate forward and the most of thus propagated light rays 2 hit the surface of PV cell 103. Positioning the optical structure at a level of the PV cell (see position "c" on FIG. 5B) allows for significantly improving energy gain in comparison to a conventional white reflector.

Figure 10:
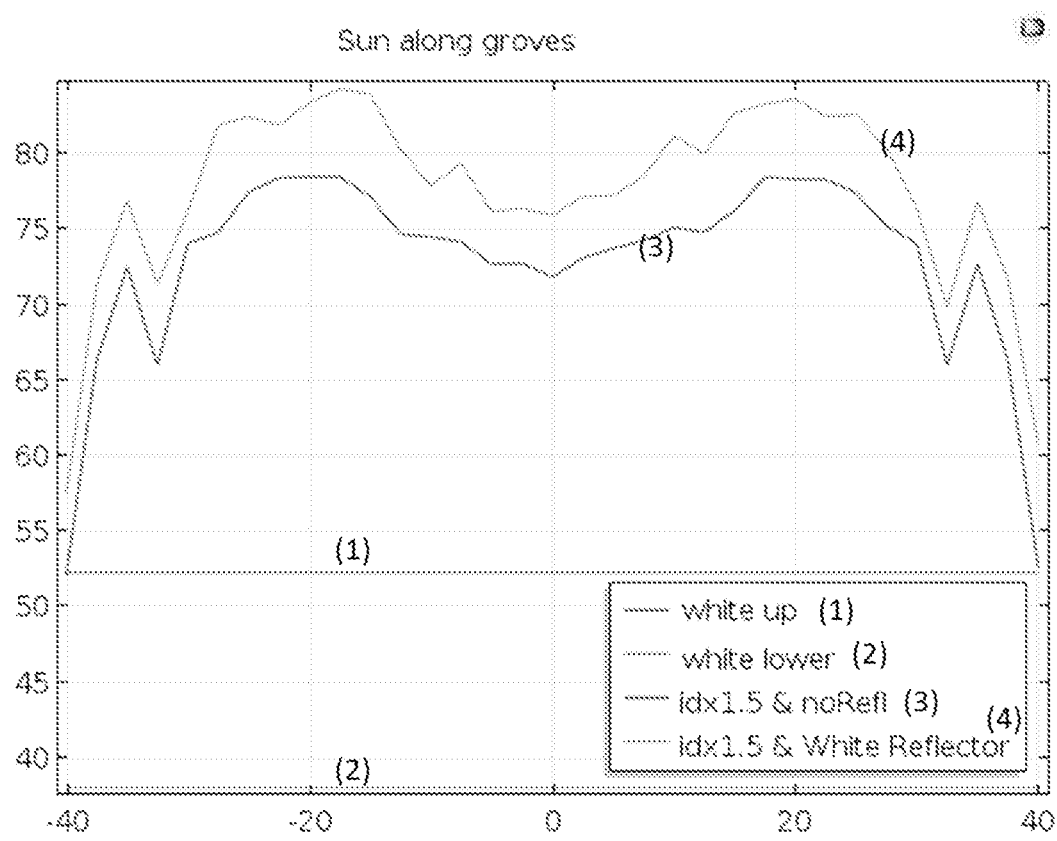
FIG. 10 is a chart presenting efficiency comparisons for daily sun rays, wherein simulation is done for a PV panel having a 4 mm space between PV cells.

FIG. 10 is an efficiency comparison chart for the optical structure 100, 200 with regard to a conventional solution, for daily sun rays. Simulation has been performed for the reflectors positioned into a 4 mm space between the PV cells (as described with regard to FIGS. 7A-7E).

Green line (2) shows a result obtained with placing a conventional white reflector at a level of a bottom surface the solar cell. Its highest reflection gain is 38%. If this conventional white reflector is positioned at the level of a top surface of the solar cell, its highest efficiency measure is 52% (dark blue line, 1).

Red line (3) is demonstrative of an efficiency of a transparent optical structure 100, 200 in the form of a patterned stripe reflector, which efficiency measure is about 75%. Light blue line (4) shows similar optical structure 100, 200 in the form of a patterned stripe reflector, but laminated on the white base layer 206. Efficiency of this solution is about 80%. Total efficiency gain over a conventional white reflector positioned at the level of the bottom surface of the solar cell is more than two times higher.

Figure 11:
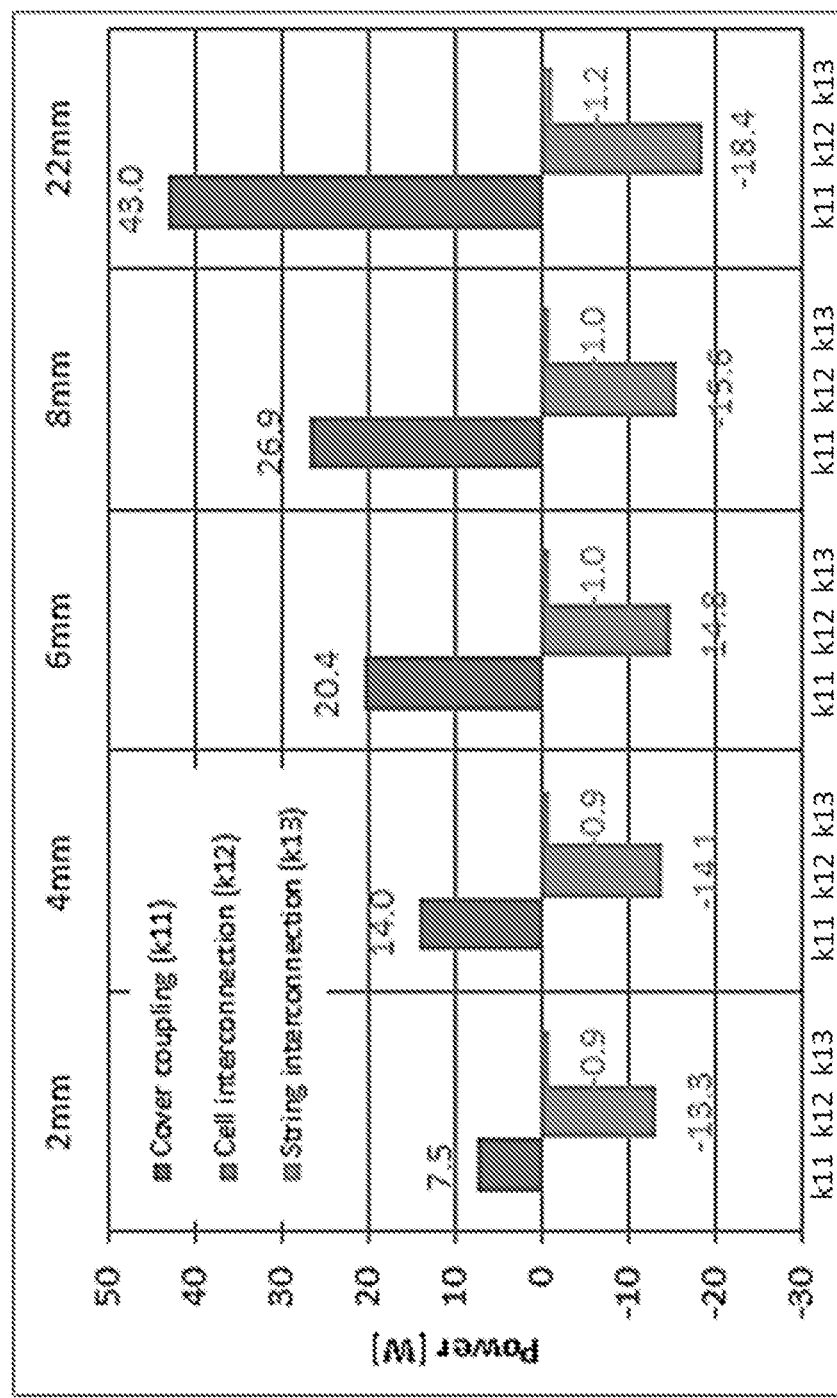
FIG. 11 is an exemplary calculation of the energy gain (backsheet gain) for a PV module, for glass-glass modules, using h different reflector space at the edge of the PV cell (cell distance).
Figure 12:
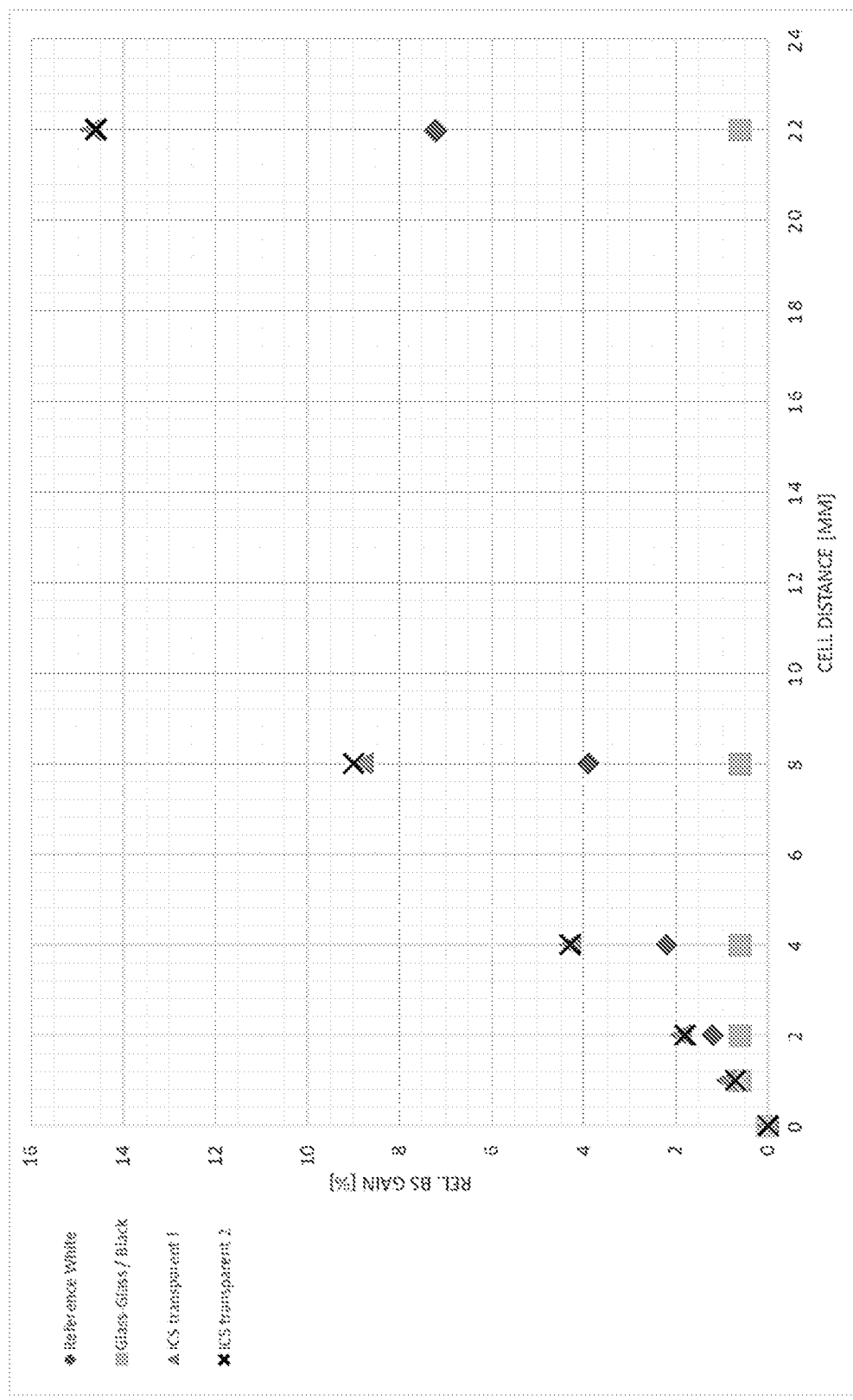
FIG. 12 is an exemplary chart of the relative efficiency gain vs. reflector space (cell distance).

An example calculation (glass-glass) of energy gain for a solar module comprising the optical structure(s) positioned at different distances with regard to the edges of the PV cells (cell distance) is shown on FIG. 11, whereas FIG. 12 is an example chart of relative efficiency gain vs. the optical structure cell distance. With reference to FIG. 12, reference data is obtained with a conventional white backsheet film ("Reference White"). Another reference data is presented by two data setups, obtained with a transparent (glass-glass) stack without a backsheet film and with a black backsheet film ("Glass-glass/black"). The data obtained for the optical structure/the reflector of the present solution contains two similar samples utilizing a transparent reflector film ("ICS transparent 1" and "ICS transparent 2"). Relative energy gain is more than two times better than the one obtained for the Reference White and multiple times better than the reference transparent- or black solutions.

Figure 14A:
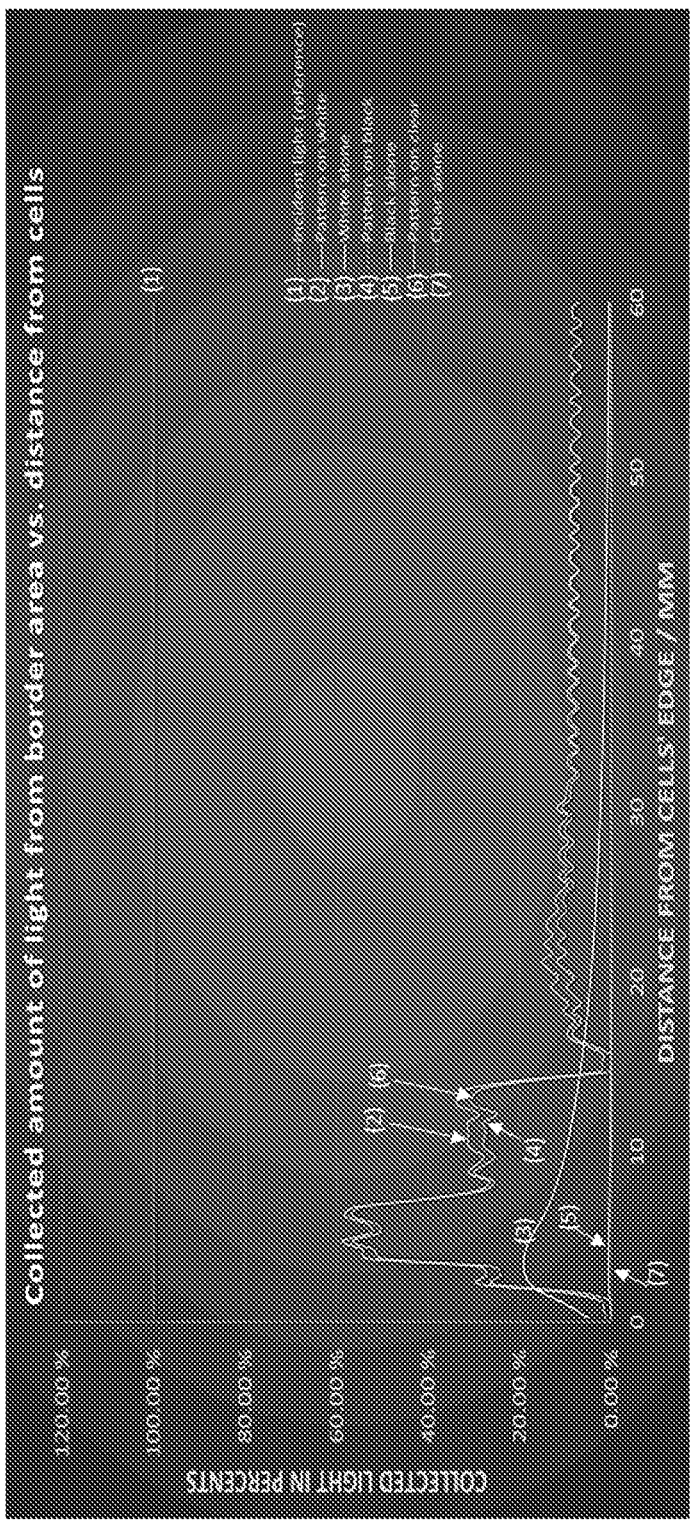
FIG. 14A shows simulated efficiency gain obtained using an optical structure solution based on the optical structure according to some embodiments.

FIG. 14A shows a simulated efficiency gain obtained using the optical structure 100, 200 implemented according to some embodiments described above. Experiments 2, 4 and 6 involving using the optical structure comprising a patterned layer 104, 204 on white-, black- and transparent (clear) backsheet (base layer 106, 206) show clear increase in collected light/energy efficiency, in comparison with non-patterned conventional solutions (marked with numerals 3, 5 and 7, accordingly).

Figure 14B:
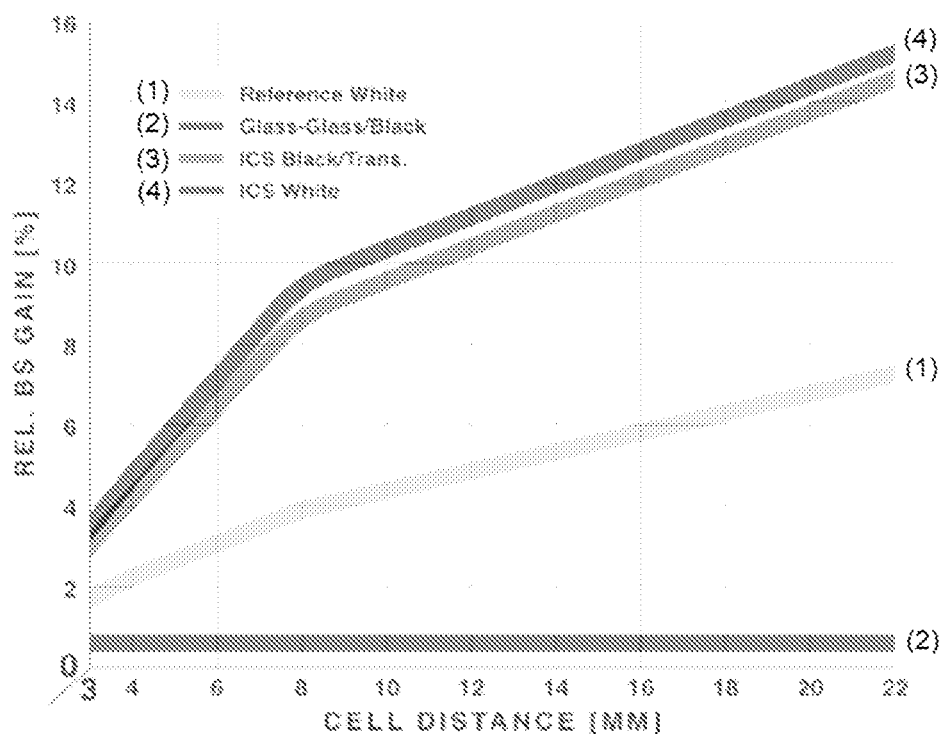
FIG. 14B shows efficiency gain for the present solution compared to conventional solutions.

FIG. 14B shows further data for obtaining energy efficiency gain by using the structure 100, 200 in PV modules and thin film PV in comparison with conventional solutions. Reference numerals 3 and 4 indicate results obtained with the structure 100, 200 with black or transparent backsheet (106, 206) and white backsheet, accordingly; whereas reference numerals 1 and 2 are illustrative of a conventional solution exploiting a white backsheet and a conventional glass-glass solution with a black backsheet.

Figure 15:
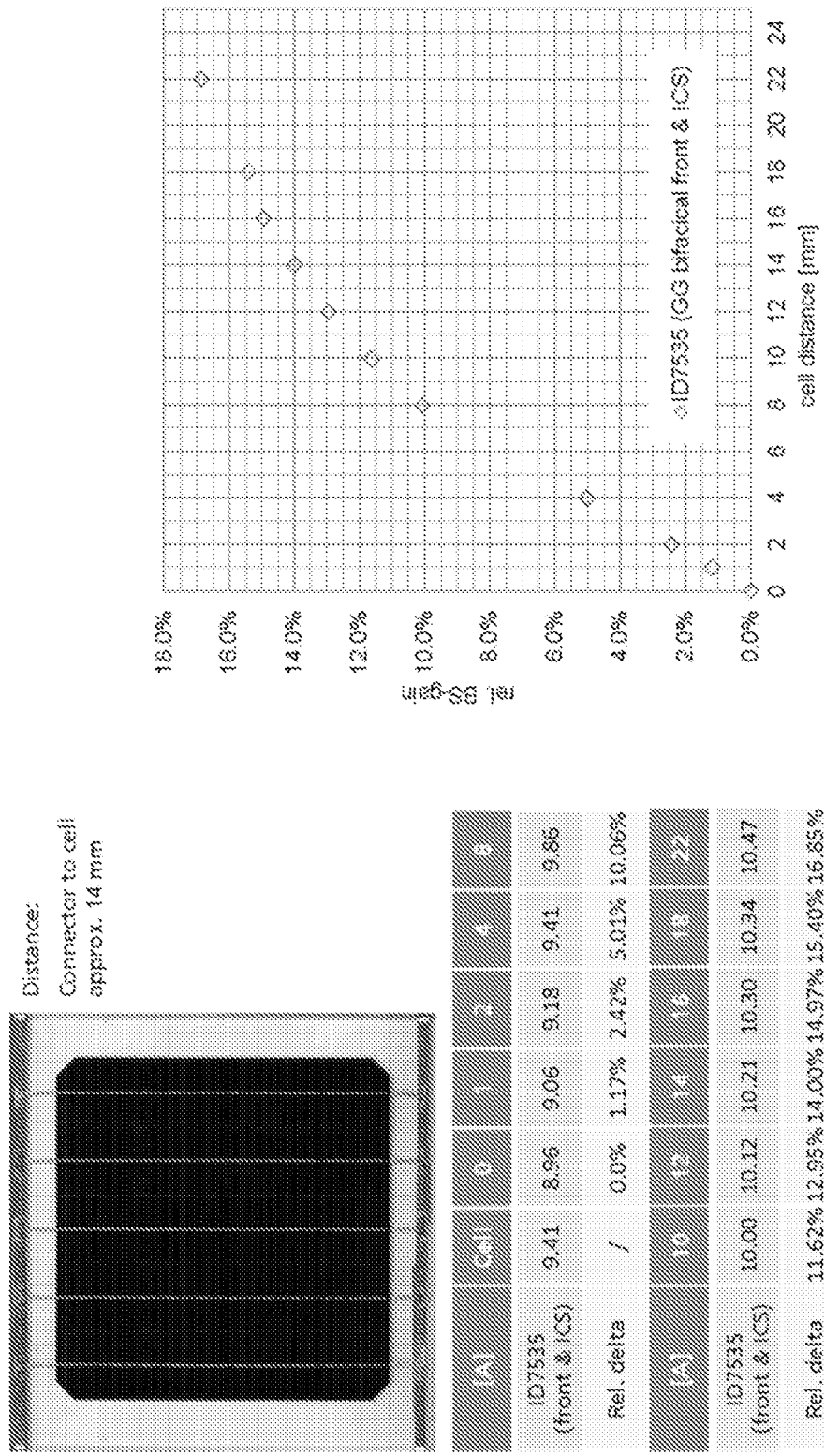
FIG. 15 shows backsheet gain measurements on further glass-glass modules.
Figure 16:
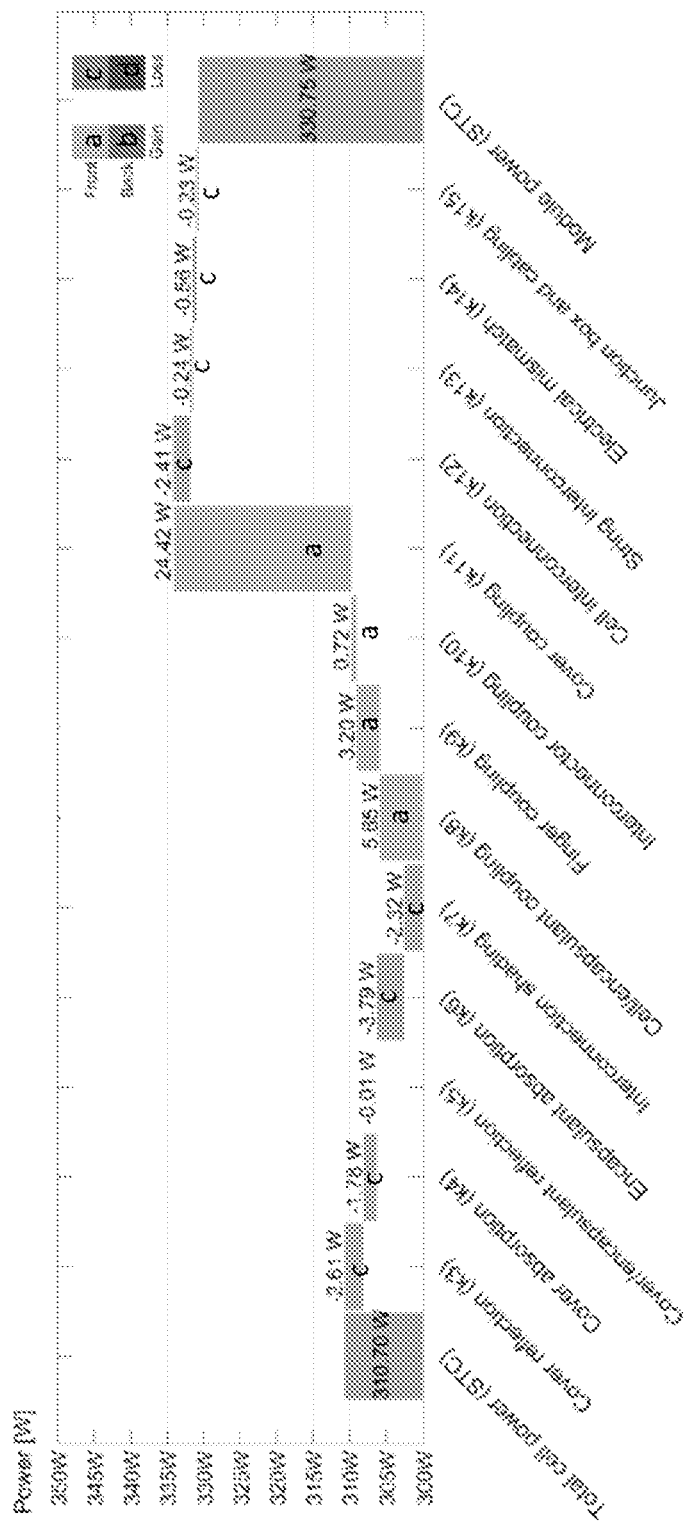
FIG. 16 shows a 4.2 mm spacing example, excluding edge area gain.

Results from the efficiency gain measurements on further glass-glass modules are further shown on FIG. 15. An example demonstrating the efficiency gain utilizing the optical structure 100, 200 on the 4.2 mm spacing, excluding edge area gain, is shown on FIG. 16 (glass-glass, monofacial, half-cells).

Figure 17:
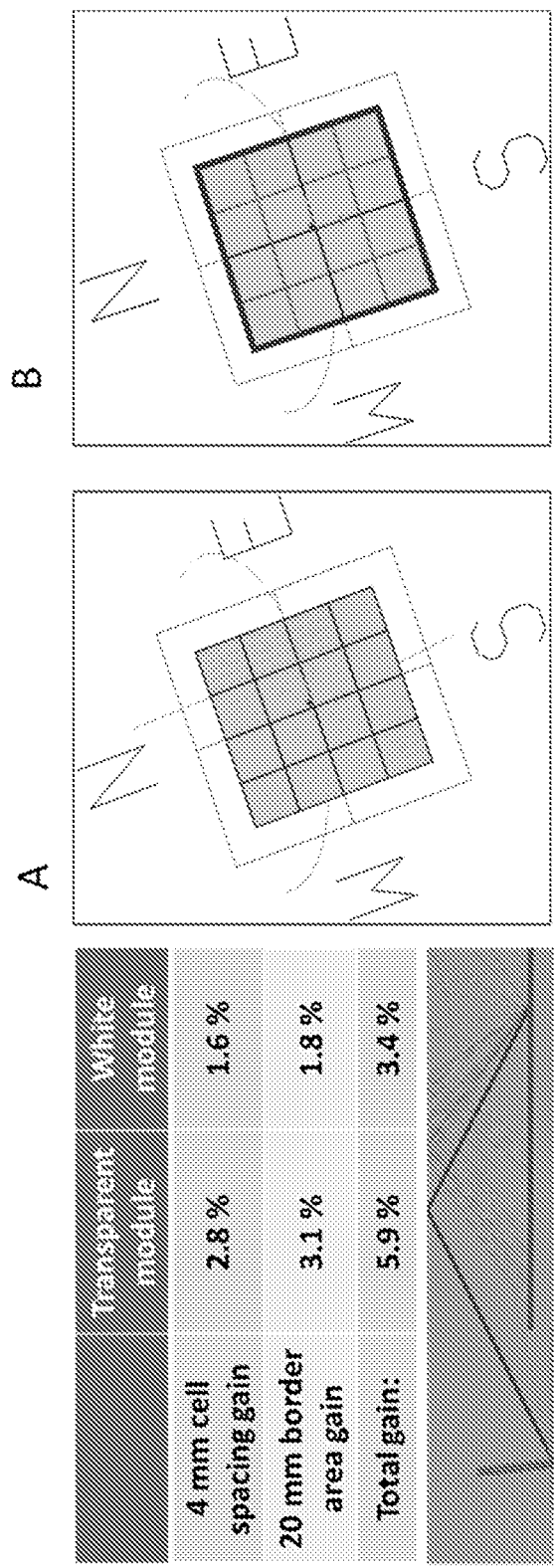
FIG. 17 shows test (PV) module simulation results based on real data from previous sample measurements.

FIG. 17 demonstrates test module simulation results based on real data from the earlier sample measurements. A table on the left shown efficiency gain obtainable by using the optical structure 100, 200 in comparison with conventional solutions. Simulation has been carried out for a 4×4 module; efficiency gain has been compared with a standard solution (with 4 mm spacing). Tests where carried out with the transparent structure 100, 200 compared to a conventional solution without a reflector, in a mono-facial PV module; and with the structure 100, 200 comprising white backsheet reflector (106, 206) compared to a conventional solution with white reflector, in a mono-facial PV module.

It should be noted that in comparison to monofacial modules, the gain in bi-facial modules is generally higher, about 8-10% gain is possible. Half-cell solutions have generally higher gain factor, such as above 7%. The best gain results (about 8%) are achieved by optimizing module configuration.

Charts A and B demonstrate the pattern 110, 210 between the solar cells (A) and the pattern 110, 210 on/around the border of the panel (B).

As already mentioned herein above, the present invention concerns an optical structure/a reflector solution with embedded cavity optics primarily for solar energy applications.

The optical structure 100, 200 comprises a fully embedded and integrated relief pattern 100, 210. The pattern 110, 210 utilizes cavities provided with at least one predetermined optical function, wherein each cavity can be configured to perform at least one optical function related to incident light. The function is thus based on pattern design, including selection of layer materials (104, 204, 106, 206) and cavity (112, 212) fill materials.

A cavity (open- or embedded, closed cavity) may be e.g. a micro-cavity or a nano-cavity as to the size thereof. The cavities may contain a number of materials potentially different from the materials of the base element and/or any one of the carrier elements. A cavity may include or be filled with fluidic material such as air or other gas, suitable liquid, and/or solid. Said solid, essentially gaseous and/or fluidic material may be provided inside the cavity or on internal (i.e. between the elements) coating surface. The substances are selected so as to provide a predetermined optical performance in terms of e.g. refractive index. The refractive index may differ from the one of the associated base- and/or carrier elements, or it may be the same.

The optical pattern 110, 210 within the structure 100, 200 is thus designed for light reflection, refraction and/or redirection purposes in order to increase the total light irradiance on the surface of a PV cell or an equivalent material/layer capable of absorbing solar energy.

Thin optical structure has the optical cavity pattern 110, 210 provided on at least one carrier element layer 104, 204, said pattern being designed to provide symmetric and/or asymmetric reflection performance in a single direction, dual direction(s) or multi-direction(s) on a single face/side or on a dual side (top and bottom side) with regard to a backsheet layer 106. 206.

The optical structure 100, 200 can be configured to combine an isotropic or anisotropic light distribution with diffusing performance, which is fully or partially formed by a combination of the patterned carrier element 104, 204 and the base layer 106, 206 provided as a colored diffusing layer (such as a white layer).

The cavity pattern 110, 210 of the thin reflector element (viz. the optical structure 100, 200) comprises at least one optical feature configured as a cavity 112, 212 positioned such as to cover a determinate area and having predetermined orientation and dimensions. Optical function of the pattern 110, 210 and of the optical structure 100, 200 is thus imparted by said at least one pattern. The pattern 110, 210 is preferably based on periodical features, such as continuous or discrete grooves, recesses or pixels. Instead of conventional refractive optical features, the pattern may be formed with the diffractive optical features and/or the grating features. One advantage of the pattern being periodical is that it can manage incident light with a larger angle distribution, in order to trap more light than a conventional reflector.

The optical structure 100, 200 thus has the pattern 110, 210 on at least one side thereof in order to generate the predetermined optical performance. A dual side pattern arrangement (FIG. 3G, for example) is an alternative option for gaining a reflection performance, especially in bi-facial PV cells or in mono-facial PV cells with transparent spacing and edge areas on the module. Additionally, multi-layer construction may be utilized in order to achieve maximal efficiency or multi-functional performances.

Hence, several optical structures 100, 200 can be joined together to form a multi-layer stack. Each of the optical structures in the stack can be provided with its own color/transparency and/or predetermined optical pattern(s) 111, 210.

The optical structure 100, 200 is configured with a predetermined degree transparency/opacity, which can be controlled controllable by adjusting shapes and dimensions of the pattern features (cavities and associated relief profiles) and the filling factor (feature density) of a surface covered by the optical structure. Transparent optical structure controls and manages light reflection and transmission in a unique manner. Transparency can be improved by provision of internal anti-reflection patterns or coatings (inside the cavity interface). Additionally, the contrast ratio of refractive indexes between materials in the cavities and interconnection between the cavities (layer material) has an important role.

The optical structure, configured as a thin embedded reflector, can be positioned under the PV cells (on the bottom side thereof) or an equivalent material capable of solar energy absorption. The optical structure may cover the entire area of the solar panel (FIGS. 3B, 3C). Additionally, the optical structure, when configured as a transparent structure, can be utilized on the top of PV cells or being integrated on the top cover glass.

The optical structure according to some embodiments is particularly suitable for being utilized at the edge areas of the PV cells (or equivalent solar energy absorbing materials), in spaces between the PV cells and the edge area surrounding said cells (FIGS. 3D-3G, 5A). The optical structure configured as a stripe reflector can be manufactured with minimized materials and costs. The stripe type optical structure may preferably utilize the air-cavity pattern solution, but other filling materials are not excluded. Whether the optical structure is intended to be used on the edges of the cells/panel, the optically functional surface of said structure (the patterned carrier element 104, 204) should be positioned at an optimal level, with regard to the cell, in order to maximize optical efficiency and energy gain. Then the most of internally reflected light resides on the (top) surface of the PV cell. Such positioning minimizes light trapping losses on the edges- and under the PV cell.

Selecting the optimal depth/thickness of the optical structure 100, 200 allows for setting a position of the optical structure with regard to the PV cell (top) surface.

This is performed by laminating the optical structure 100, 200 between two polymeric layers (top and bottom side), for example. The polymer can be EVA or any other suitable material. In the same manner, depth/thickness control can be performed for dual-side structures that have two patterned layers 104, 204 at the level of top- and bottom surfaces of an exemplary bi-facial PV cell.

The optical structure can be placed on a solar module using roll manufacturing methods. The structure can be provided as a full-size layer (in relation to the panel) or a narrow, elongated piece of material, such as a stripe, wherein the latter has to be aligned with an automated robotic system, for example.

Additionally or alternatively, the optical structure can be provided in two-dimensional flat shape, such as in a cross-format for PV cell corners, for example.

The optical structure is preferably produced by means of roll-to-roll methods or the methods equivalent thereto. At first, a principal pattern profile master is replicated, as a single-sided or a double-sided solution, to fabricate a principal medium layer. Replication can be performed by imprinting methods, such as thermal- or UV imprinting, for example. An entirely flat layer is further laminated onto the patterned/profiled layer to form a final structure with embedded cavity profiles (single-sided or double-sided).

Figure 13:
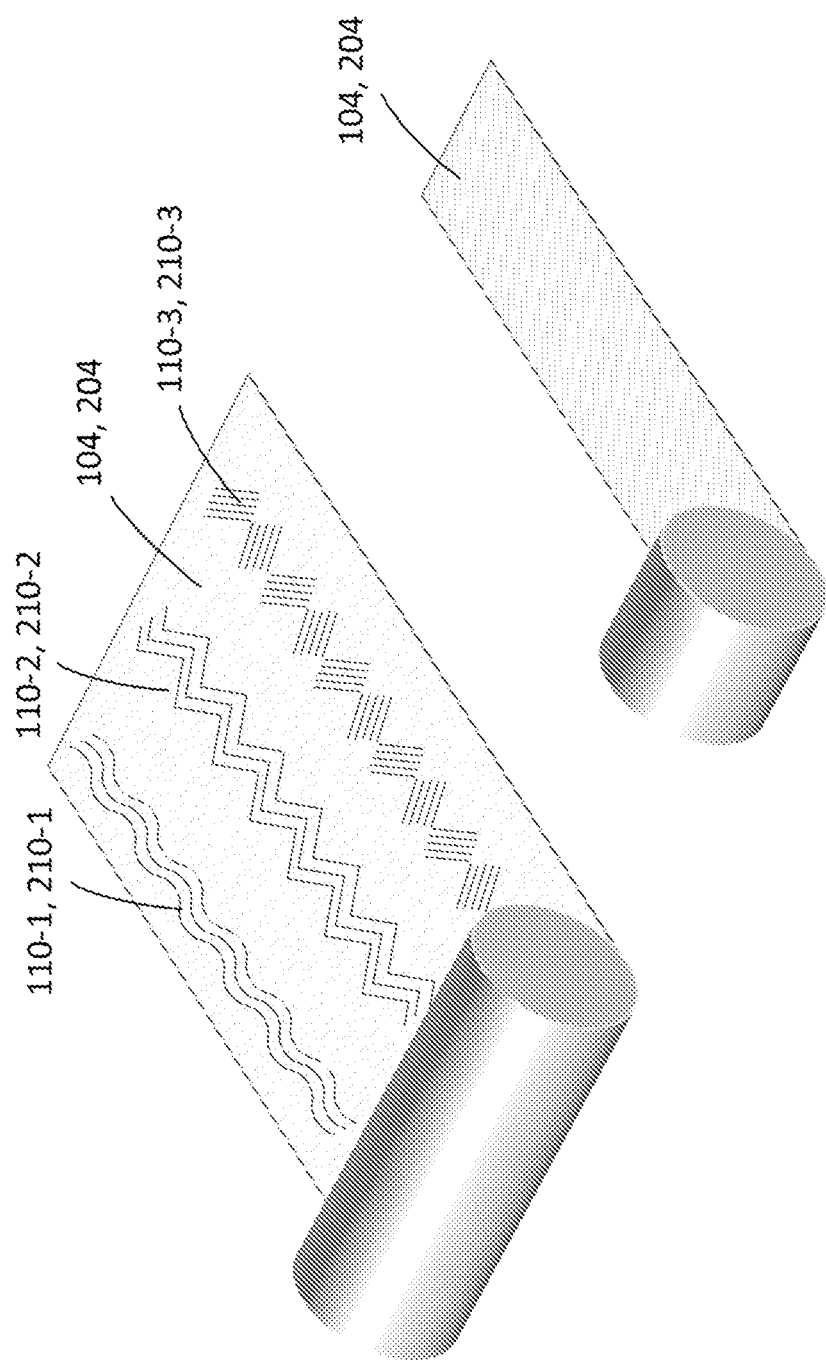
FIG. 13 shows a roll-to-roll manufacturing method for the optical structure, according to some embodiments.

Manufacturing of the optical structure 100, 200 by the roll-to-roll method is shown on FIG. 13. The patterned film 104, 204 can be produced in different widths having a single pattern or multiple patterns (110-1, 110-2, 100-3, 210-1, 210-2, 210-3). The broader film with multiple patterns can be further cut into the narrow stripes. Design of the patterns, including shape, dimensions, orientation, alignment and periodicity of the features (cavity profiles 112, 212 and associated relief profiles 111, 211) Pattern shape and design can vary in the same production film for different purposes.

A fabricated master tool to obtain an optically functional carrier element for the optical structure according to some embodiments is shown on FIG. 14. FIG. 14 further addresses obtaining the optical structure with the profiles with varying parameters (P, pitch; w, w1 width of a cavity; w2, width of a junction area; h height of a cavity; theta ($\theta$) 1 and theta 2, cavity angle parameters). All above mentioned parameters are thus adjustable, whereby the optical function attainable by said optical structure can be precisely regulated.

The patterned element 104, 204 can be produced also by other methods, e.g. by extrusion methods. In particular, this concerns simple pattern profiles for single- or double-sided solutions. dual side. Additionally, by providing a fully laminated optical structure 100, 200 with the base- and carrier layers having different refractive indexes in a range of about 1,1 to about 1,7, an optical function between the layers can be achieved to provide for a reasonable performance, especially for the transparent optical structure.

In another aspect, a photovoltaic solar panel is provided comprising the optical structure according to any of the embodiments described hereinabove and an at least one photovoltaic cell.

In a further aspect, a method for manufacturing an optical structure is provided. Said method comprise: obtaining an entirely flat, planar base element; obtaining an at least one flat, planar carrier element provided with a plurality of open cavities arranged into an at least one pattern, laminating said at least one carrier element together with a base element such, that an at least one embedded, optically functional cavity pattern is established at an interface between the elements, wherein the optical structure obtained hereby is rendered optically functional by adjusting cavity profiles within each said embedded pattern and/or within each said carrier element, wherein an optical function is selected from light reflection, light refraction and light redirection.

In preferred embodiments, the pattern or patterns are produced on the carrier element by roll-to-roll thermal or UV imprinting or extrusion methods.

In some embodiments, lamination is performed by roll-to-roll or roll-to-sheet utilizing conventional adhesive or surface threated non-adhesive methods.

In the method, two carrier elements can be further laminated on each side of the base element, whereupon said at least one embedded, optically functional pattern is established at the interface between the base element and each of the carrier elements.

Optical pattern area can be bonded only on the edge area, wherein the sealed edge area isolates any material or gas from penetration into the pattern profiles. Laser cutting can be utilized, which also melts the cut area (edge area) during the process. Additionally, the bonding edge can be utilized as described herein above.

Embodiments of the present invention will now be presented in the following numbered clauses:

1. An optical structure (100, 200) comprising:
    an entirely flat, planar base element (106, 206); and
    an at least one flat, planar carrier element (104, 204) provided with a plurality of open cavities arranged into an at least one pattern,
    wherein the carrier element(s) and optionally the base element are substantially optically transparent,
    wherein said at least one carrier element (104, 204) is laminated together with a base element (106, 206) such, that an at least one embedded, optically functional cavity pattern (110, 210) is established at an interface between said elements, and
    wherein the optical structure is rendered optically functional by adjusting cavity profiles within each said embedded pattern and/or within each said carrier element, wherein an optical function is selected from light reflection, light refraction and light redirection.

2. The optical structure of clause 1, wherein said embedded cavities are filled with an internal medium having refractive index different from the refractive index of a medium material surrounding said cavities.

3. The optical structure of any one of clause 1 or 2, wherein said embedded cavities are filled with the internal medium material provided in fluidic or solid form.

4. The optical structure of any preceding clause, wherein the internal medium fluidic material is selected from the group consisting of: air, gas, and liquid.

5. The optical structure of any preceding clause, wherein the cavity profiles are adjustable in terms of at least one of the dimensions, shape, orientation and periodicity.

6. The optical structure of any preceding clause, wherein the carrier element(s) and optionally a base element are made of a polymeric material, selected from the group consisting of: PET, PEN, PC, PMMA, PS, COP, PI, PEI, and PEEK.

7. The optical structure of any preceding clauses 1-5, wherein the carrier element(s) and optionally a base element are made of glass.

8. The optical structure of any preceding clause, wherein the base element is further imparted with a predetermined color.

9. The optical structure of any preceding clause, wherein the base element is black or white.

10. The optical structure of any preceding clause, wherein the cavities are configured as grooves, symmetric or asymmetric, such as continuous grooves or discrete grooves, microlenses, dots, recesses, pixels, gratings, and the like.

11. The optical structure of any preceding clause, in which a number of embedded, optically functional patterns are arranged side-by-side, wherein the cavity profile of one pattern forms a mirror image of the cavity profile of an adjoining pattern.

12. The optical structure of any preceding clause, comprising two carrier elements (204-1, 204-2) laminated on each side of the base element (206), wherein at least one embedded, optically functional pattern (210-1, 210-2) is established at the interface between the base element (206) and each of the carrier elements (204-1, 204-2).

13. The optical structure of any preceding clause, in which the embedded, optically functional cavity pattern is configured to provide symmetric or asymmetric reflection performance in a single direction, in two directions or in a plurality of directions.

14. The optical structure of any preceding clause, configured to receive light incident thereto at angles exceeding an angle at which total internal reflection occurs, and to further apply the optical function onto light received hereby.

15. The optical structure of any preceding clause, in which the embedded, optically functional cavity pattern or patterns are disposed such as to align with a surface of a photovoltaic cell or cells (103) in a solar photovoltaic panel (1001).

16. The optical structure of any preceding clause, in which the embedded, optically functional cavity pattern or patterns are disposed below the photovoltaic cell material and/or above said photovoltaic cell material.

17. The optical structure (200A, 200B, 200D) of any preceding clauses 1-15, configured in the form of an elongated stripe disposed between the photovoltaic cells in the solar photovoltaic panel.

18. The optical structure of clause 17, said structure being arranged between said photovoltaic cells optionally in a crosswise manner.

19. The optical structure of any preceding clause configured as a film, preferably, a thin film.

20. An optical element configured as an optical structure according to any one of clauses 1-19.

21. The optical element of clause 20, configured as a reflector element, optionally, as a backsheet reflector.

22. A photovoltaic solar panel comprising the optical structure of any one of clauses 1-19 and an at least one photovoltaic cell.

23. The photovoltaic solar panel of clause 22, wherein the optical structure is arranged between the photovoltaic cells optionally in a crosswise manner.

24. A method for manufacturing an optical structure, comprising:
    obtaining an entirely flat, planar base element;
    obtaining an at least one flat, planar carrier element provided with a plurality of open cavities arranged into an at least one pattern,
    wherein the carrier element(s) and optionally the base element are substantially optically transparent,
    laminating said at least one carrier element together with a base element such, that an at least one embedded, optically functional cavity pattern is established at an interface between said elements,
    wherein the optical structure obtained hereby is rendered optically functional by adjusting cavity profiles within each said embedded pattern and/or within each said carrier element, wherein an optical function is selected from light reflection, light refraction and light redirection.

25. The method of clause 24, wherein the pattern or patterns are produced on the carrier element by roll-to-roll thermal or UV imprinting or extrusion methods.

26. The method of any one of clauses 24 or 25, wherein lamination is performed by roll-to-roll or roll-to-sheet utilizing conventional adhesive or surface threated non-adhesive methods.

27. The method of any one of clauses 24-26, wherein two carrier elements are laminated on each side of the base element, whereupon said at least one embedded, optically functional pattern is established at the interface between the base element and each of the carrier elements.

28. An optical structure (100, 200) comprising:
    an entirely flat, planar base element (104, 204); and an at least one flat, planar carrier element (106, 206) provided with a plurality of cavities arranged into an at least one pattern, wherein the carrier element(s) and optionally the base element are substantially optically transparent, wherein said at least one carrier element (104, 204) is laminated together with a base element (106, 206) such, that an at least one embedded, optically functional cavity pattern (110, 210) is established at an interface between said elements, and wherein the optical structure is rendered optically functional by adjusting cavity profiles within each said embedded pattern and/or within each said carrier element, wherein an optical function is selected from light reflection, light refraction and light redirection, the optical structure being disposed between photovoltaic cells (103) in a solar photovoltaic panel (1001).

29. The optical structure of clause 28, being configured in the form of an elongated stripe.

30. The optical structure of clauses 28 and 29, arranged between said photovoltaic cells in a crosswise manner.

31. The optical structure of any preceding clauses 28-30, wherein the base element is further imparted with a predetermined color, such as black or white.

Consequently, a skilled person may on the basis of this disclosure and general knowledge apply the provided teachings in order to implement the scope of the present invention as defined by the appended claims in each particular use case with necessary modifications, deletions and additions.

The invention claimed is:

1. An optical structure comprising:

an entirely flat, planar base element disposed between photovoltaic cells in a solar photovoltaic panel so that the optical structure is disposed between the photovoltaic cells in the solar photovoltaic panel; and an at least one flat, planar carrier element provided with a plurality of geometrically and optically asymmetric open cavities with asymmetric cavity profiles arranged into an at least one pattern, the open cavities comprising grating structures, wherein the carrier element(s) and the pattern(s) are substantially optically transparent, wherein said at least one carrier element is laminated together with a base element such, that an at least one embedded, optically functional cavity pattern is established at an interface between said elements, each said embedded, optically functional cavity pattern and/or each said carrier element comprising the asymmetric cavity profiles, wherein the optical structure is rendered optically functional by adjusting the asymmetric cavity profiles within each said embedded, optically functional cavity pattern and/or within each said carrier element, wherein an optical function is selected from light reflection, light refraction and light redirection, wherein the embedded, optically functional cavity pattern is based on a periodical arrangement of the grating structures of the open cavities, and wherein the embedded, optically functional cavity pattern is configured to provide asymmetric light reflection, light refraction, or light redirection performance in a single direction based on the position of said optical structure in relation of the photovoltaic cells in the solar photovoltaic panel.

2. The optical structure of claim 1, in which a number of the embedded, optically functional patterns are arranged side-by-side, wherein the cavity profile of one pattern forms a mirror image of the cavity profile of an adjoining pattern.

3. The optical structure of claim 1, in which a number of the embedded, optically functional patterns are arranged so that the cavity profiles of the patterns are oriented in different directions such that the optical structure provides asymmetric light reflection in a plurality of directions.

4. The optical structure of claim 1, wherein said open cavities are filled with the internal medium material provided in fluidic or solid form, and wherein the internal medium fluidic material is selected from the group consisting of: air, gas, and liquid.

5. The optical structure of claim 1, wherein the cavity profiles are adjustable in terms of at least one of the dimensions, shape, orientation and periodicity.

6. The optical structure of claim 1, wherein the carrier element(s) is/are made of a polymeric material, selected from the group consisting of: PET, PEN, PC, PMMA, PS, COP, PI, PEI, and PEEK.

7. The optical structure of claim 1, wherein the carrier element(s) is/are made of glass.

8. The optical structure of claim 1, wherein the base element is further imparted with a predetermined color.

9. The optical structure of claim 1, wherein the base element is black or white.

10. The optical structure of claim 1, wherein the open cavities are configured as grooves.

11. The optical structure of claim 10, wherein the cavities further comprise any of continuous grooves, discrete grooves, microlenses, dots, recesses, pixels, and gratings.

12. The optical structure of claim 1, wherein said open cavities are filled with an internal medium having refractive index different from the refractive index of a medium material surrounding said open cavities.

13. The optical structure of claim 1, comprising two carrier elements laminated on each side of the base element, wherein at least one embedded, optically functional pattern is established at the interface between the base element and each of the carrier elements.

14. The optical structure of claim 1, configured to receive light incident thereto at angles exceeding an angle at which total internal reflection occurs, and to further apply the optical function onto light received hereby.

15. The optical structure of claim 1, in which the embedded, optically functional cavity pattern or patterns are disposed to align with a surface of a photovoltaic cell or cells in a solar photovoltaic panel.

16. The optical structure of claim 1, in which the embedded, optically functional cavity pattern or patterns are disposed below the photovoltaic cell material and/or above said photovoltaic cell material.

17. The optical structure of claim 1, configured in the form of an elongated stripe disposed between the photovoltaic cells in the solar photovoltaic panel.

18. The optical structure of claim 17, said structure being arranged between said photovoltaic cells.

19. The optical structure of claim 1 configured as a film.

20. An optical element configured as an optical structure according to claim 1.

21. The optical element of claim 20, configured as a reflector element.

22. A photovoltaic solar panel comprising the optical structure of claim 1 and at least one photovoltaic cell.

23. The photovoltaic solar panel of claim 22, wherein the optical structure is arranged between the photovoltaic cells.

* * * * *